United States Patent
Ro et al.

(10) Patent No.: US 9,788,042 B2
(45) Date of Patent: Oct. 10, 2017

(54) IMAGE DISPLAY APPARATUS AND METHOD OF OPERATING THE SAME

(71) Applicant: LG ELECTRONICS INC., Seoul (KR)

(72) Inventors: Sijeong Ro, Seoul (KR); Myungbok Yoo, Seoul (KR); Duksung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 14/837,867

(22) Filed: Aug. 27, 2015

(65) Prior Publication Data
US 2016/0066011 A1    Mar. 3, 2016

(30) Foreign Application Priority Data
Aug. 27, 2014    (KR) .................. 10-2014-0112537

(51) Int. Cl.
*H04N 21/41* (2011.01)
*G06F 3/0346* (2013.01)
(Continued)

(52) U.S. Cl.
CPC ......... *H04N 21/4131* (2013.01); *G06F 3/017* (2013.01); *G06F 3/0346* (2013.01);
(Continued)

(58) Field of Classification Search
None
See application file for complete search history.

(56) References Cited

U.S. PATENT DOCUMENTS

2013/0231758 A1* 9/2013 Kim ................. G05B 15/02
    700/90
2014/0168062 A1* 6/2014 Katz ................. G06F 3/017
    345/156
(Continued)

FOREIGN PATENT DOCUMENTS

KR    10-1998-007692 A    3/1998
KR    10-2014-0029810 A   3/2014
(Continued)

OTHER PUBLICATIONS

Korean Office Action for Application 10-2014-0112537 dated Sep. 17, 2015.
(Continued)

*Primary Examiner* — Joseph Haley
*Assistant Examiner* — Emily Frank
(74) *Attorney, Agent, or Firm* — Ked & Associates LLP

(57) ABSTRACT

Provided is an image display apparatus including: an interface unit through which a pointing signal is received from an external input device; and a display unit that includes a first region and a second region which are distinguishable from each other and on any one of which an image object of which a function is activated by the pointing signal is displayed; and a controller that activates an application corresponding to a predetermined pattern, when in a state where a content screen is output to the first and second regions of the display unit, the image object that is displayed according to the pointing signal moves in the predetermined pattern, in which while maintaining the outputting of the content screen, the controller performs control in such a manner that a control screen for an external apparatus, which corresponds to the activation of the application, is output to the second region.

23 Claims, 25 Drawing Sheets

(51) Int. Cl.

| | | |
|---|---|---|
| *G06F 3/0481* | (2013.01) | |
| *G06F 3/0484* | (2013.01) | |
| *G06F 3/0485* | (2013.01) | |
| *H04N 21/436* | (2011.01) | |
| *H04N 21/475* | (2011.01) | |
| *H04N 5/44* | (2011.01) | |
| *H05B 33/08* | (2006.01) | |
| *G06F 3/01* | (2006.01) | |
| *G08C 17/02* | (2006.01) | |
| *H04N 21/422* | (2011.01) | |
| *H04N 21/4223* | (2011.01) | |
| *H04N 21/431* | (2011.01) | |
| *H04N 21/485* | (2011.01) | |
| *H04N 21/81* | (2011.01) | |
| *H04N 21/84* | (2011.01) | |

(52) U.S. Cl.
CPC ........ *G06F 3/0485* (2013.01); *G06F 3/04817* (2013.01); *G06F 3/04847* (2013.01); *G08C 17/02* (2013.01); *H04N 5/44* (2013.01); *H04N 5/4403* (2013.01); *H04N 21/4223* (2013.01); *H04N 21/42222* (2013.01); *H04N 21/4312* (2013.01); *H04N 21/43615* (2013.01); *H04N 21/475* (2013.01); *H04N 21/485* (2013.01); *H04N 21/8173* (2013.01); *H04N 21/84* (2013.01); *H05B 33/0863* (2013.01); *G08C 2201/30* (2013.01); *G08C 2201/32* (2013.01); *G08C 2201/92* (2013.01)

(56) References Cited

U.S. PATENT DOCUMENTS

| | | | | |
|---|---|---|---|---|
| 2014/0340311 | A1* | 11/2014 | Holz | ................. B65D 75/5877 345/158 |
| 2016/0112752 | A1* | 4/2016 | Selvaraj | ............ H04N 21/4312 725/41 |

FOREIGN PATENT DOCUMENTS

| | | |
|---|---|---|
| KR | 10-2014-0041663 A | 4/2014 |
| WO | WO 2012/088515 A2 | 6/2012 |

OTHER PUBLICATIONS

European Search Report issued in Application No. 15182448.9 dated Jan. 29, 2016.

* cited by examiner

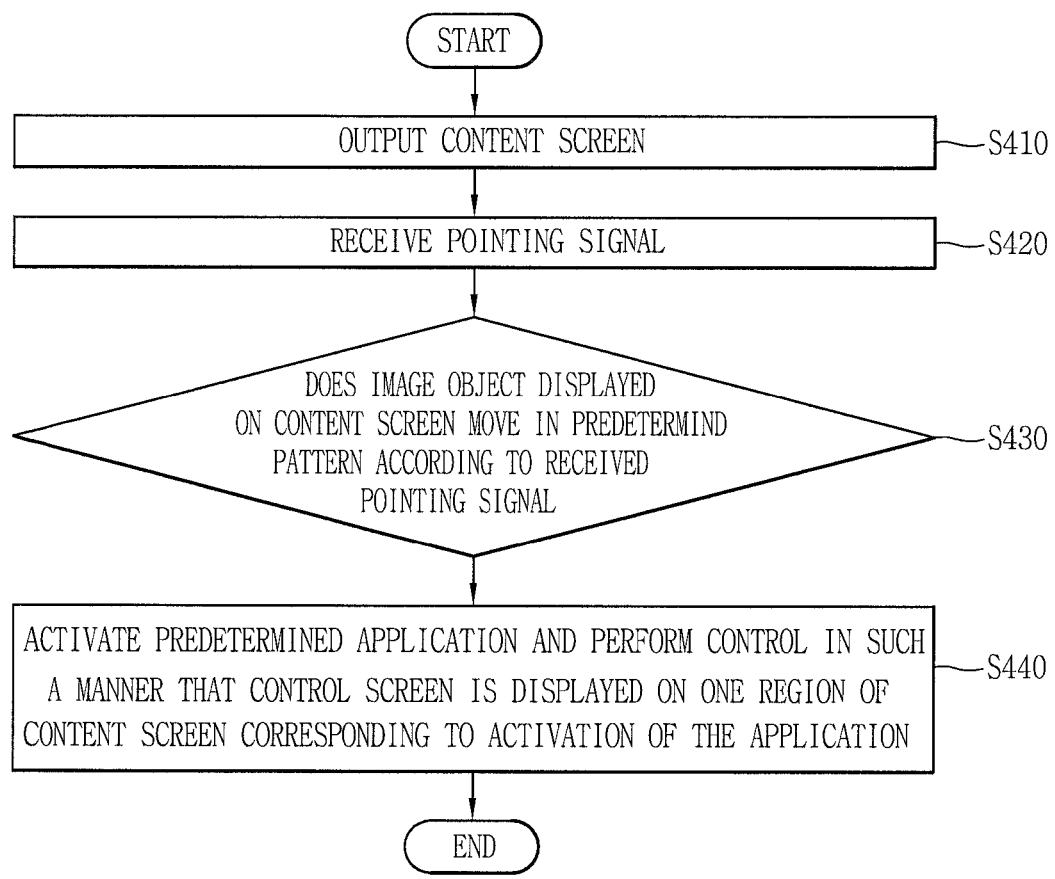

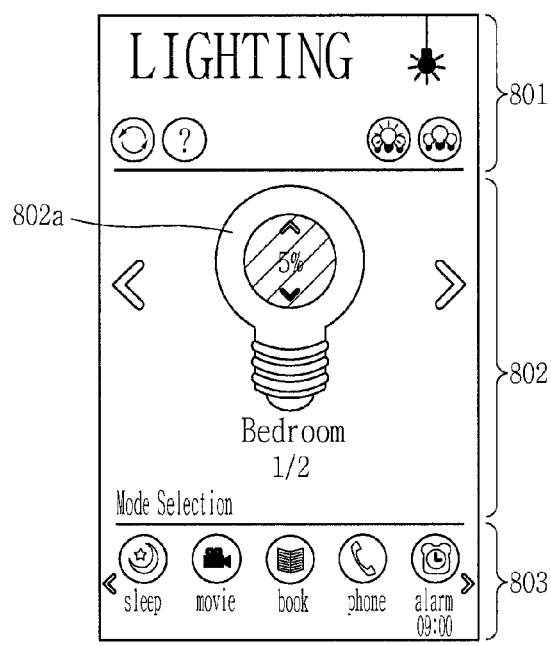
FIG. 8B(a)
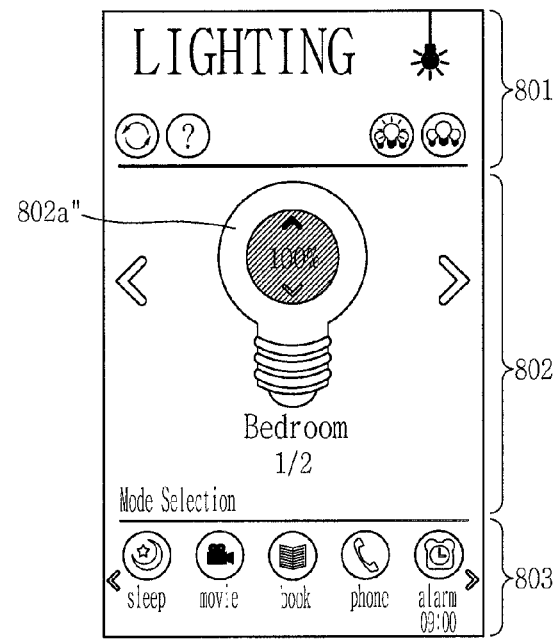
FIG. 8B(b)
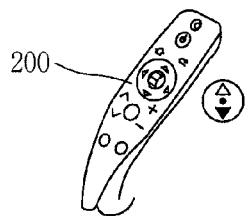

IMAGE DISPLAY APPARATUS AND METHOD OF OPERATING THE SAME

CROSS-REFERENCE TO RELATED APPLICATION

This application claims priority under 35 U.S.C. §119 to Korean Application No. 10-2014-0112537 filed on Aug. 27, 2014, whose entire disclosure is hereby incorporated by reference.

BACKGROUND

1. Field

The present invention relates to an image display apparatus and a method of operating the image display apparatus, and more particularly to an image display apparatus that is capable of receiving a pointing signal from an external input device and a method of operating the image display apparatus.

2. Background

An image display device is a device that receives and displays broadcast signals, records and reproduces a moving image, records and reproduces audio, or displays a user input signal and signals transmitted from a web server. Such an image display device includes a television set, a computer monitor, a projector, and a tablet PC.

The image display device has increasingly multiple functions. In the recent years, the image display device has been realized in the form of a multimedia player equipped with multiple functions including photographing, shooting of video, and gaming, in addition to basic functions of receiving broadcast and playing audio and video files. More recently, the image display device has been realized as a smart device (for example, a smart television). Therefore, the image display device not only has access to the Internet, but operates also in connection with a mobile terminal and a computer.

Furthermore, operation of an apparatus, such as a lighting apparatus, an air conditioner, a gas range, or an audio apparatus, also can be controlled using the image display apparatus. The image display apparatus can perform many functions and this requires the user to perform many kinds of complicated control on the image display apparatus. However, a problem with an existing button-type remote controller is that functions of complicated, various graphic user interfaces (GUI) cannot be efficiently controlled. In order to solve such a problem, a spatial remote controller equipped with a three-dimensional pointing function can be substituted for an existing infrared communication-type remote controller.

There is an increasing need for a user interface environment in which operation of each operation of apparatuses that operate in conjunction with the image display apparatus is conveniently controlled using the spatial remote controller.

BRIEF DESCRIPTION OF THE DRAWINGS

The embodiments will be described in detail with reference to the following drawings in which like reference numerals refer to like elements wherein:

FIG. 4 is an exemplary flowchart for describing a method of operating the image display apparatus according to an embodiment of the present invention;

DETAILED DESCRIPTION

Figure 1:
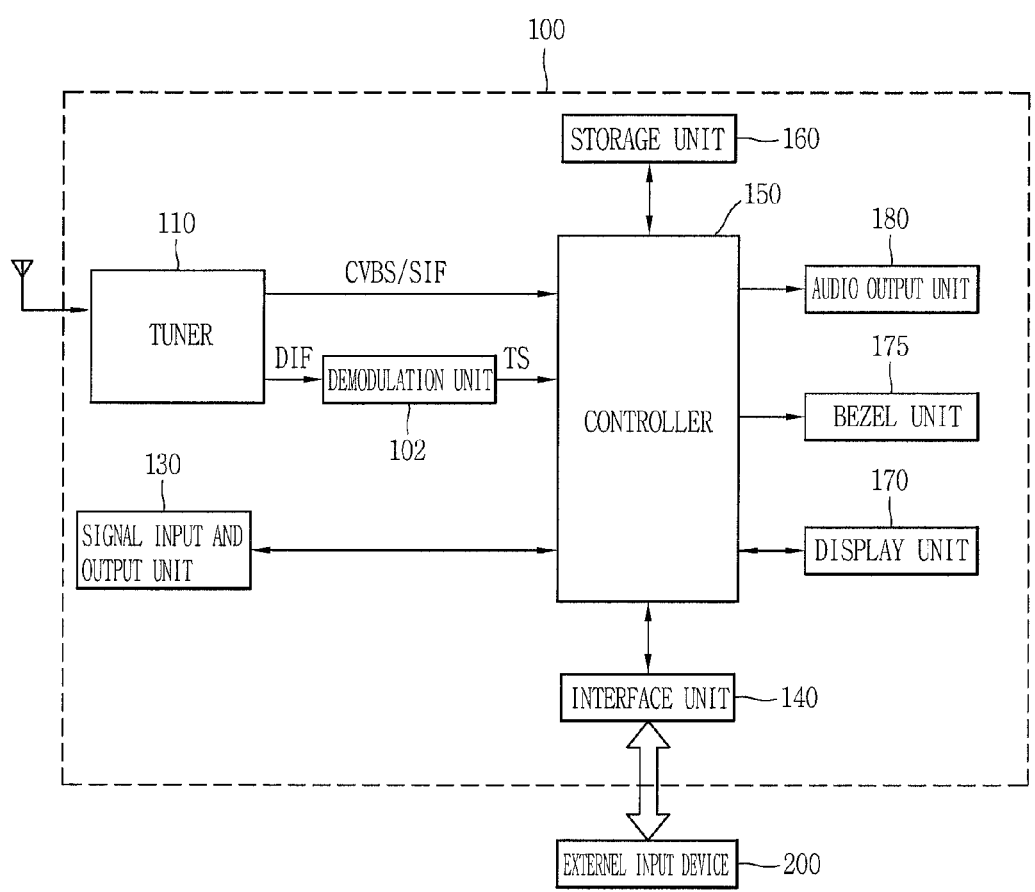
FIG. 1 is a block diagram illustrating an image display apparatus according to the present invention and an external input device.

Description will now be given in detail of the exemplary embodiments, with reference to the accompanying drawings. For the sake of brief description with reference to the drawings, the same or equivalent components will be provided with the same reference numbers, and description thereof will not be repeated.

Referring to the accompanying drawings, embodiments according to the present invention are described in detail below in order to provide all information necessary to teach one of ordinary skill in the art to practice the present invention. However, the present invention is not limited to the embodiments described here, but can be realized also as modifications, alterations, or even improvements. What is considered not to be related to the description of the embodiments is not illustrated in the drawing, and like constituent parts are given like reference characters throughout the specification for the purpose of providing the clear description.

An image display device referred to in the present specification includes an apparatus that receives and displays radio broadcasts, an apparatus that records and reproduces a moving image, an apparatus that records and reproduces audio signals.

FIG. 1 is a block diagram illustrating an image display device 100 according to the present invention and an external input device 200. The image display device 100 includes a tuner 110, a demodulation unit 120, a signal input and an output unit 130, an interface unit 140, a controller 150, a storage unit 160, a display unit 170 and an audio output unit 180. The external input device 200 is an apparatus that is separated from the image display device 100, but may be included as one constituent element of the image display device 100.

Referring to FIG. 1, the tuner 110 selects a broadcast signal corresponding to a channel selected by the user, from radio frequency (RF) broadcast signals received through an antenna, and converts the selected broadcast signal into an intermediate frequency signal or a baseband video and voice signal. For example, if the RF broadcast signal is a digital broadcast signal, the tuner 110 converts the RF broadcast signal into a digital IF signal DIF. In contrast, if the RF broadcast signal is an analog broadcast signal, the tuner 110 converts the RF broadcast signal into a baseband video and voice signal CVBS/SIF. In this manner, the tuner 110 is a hybrid tuner that processes the digital broadcast signal and the analog broadcast signal.

A digital IF signal DIF, output from the tuner 110, is input into the demodulation unit 120, and the analog baseband video and voice signal CVBS/SIF, output from the tuner 110, is input into the controller 250.

The tuner 120 receives a single carrier RF broadcast signal according to the Advanced Television Systems Committee (ATSC) standards or a multiple-carrier RF broadcast signal according to the Digital Video Broadcasting (DVB) standards.

Although one tuner 110 is illustrated in the drawings, the image display device 100 is not limited to the one tuner and may include the multiple tuners, for example, first and second tuners. In this case, the first tuner receives a first RF broadcast signal corresponding to the broadcast channel selected by the user, and the second tuner receives a second RF broadcast signal corresponding to the already-stored broadcast channel, sequentially or periodically. The second tuner converts the RF broadcast signal into the digital IF signal DIF, or the analog baseband video and voice signal CVBS/SIF, in the same manner as the first tuner.

The demodulation unit 120 receives the digital IF signal DIF that results from the conversion and performs a demodulation operation.

If the digital IF signal DIF, output from the tuner 110, is in the ATSC format, the demodulation unit 120 performs 8-vestigial side band (8-VSB) modulation. The 8-vestigial side band (8-VSB) demodulation results from vestigial side band modulation, which is single carrier amplitude modulation using the National Television System Committee (NTSC) frequency bandwidth. At this time, the demodulation unit 120 performs channel decoding, such as Trellis decoding, de-interleaving, and Reed-Solomon decoding. To that end, the demodulation unit 120 includes a Trellis decoder, a de-interleaver, a Reed-Solomon decoder, and the like.

When the digital IF signal DIF, output from the tuner 110, is in the DVB format, the demodulation unit 120 performs Coded Orthogonal Frequency Division Modulation (COFDMA) modulation. At this time, the demodulation unit 120 performs channel decoding, such as convolution decoding, the de-interleaving, and the Reed-Solomon decoding. To do this, the demodulation unit 120 includes a convolution decoder, the de-interleaver, and the Reed-Solomon decoder.

In this manner, the demodulation unit 120 outputs a stream signal TS after performing the demodulation and the channel decoding. At this time, the stream signal results from multiplexing a video signal, a voice signal, or a data signal. For example, the stream signal TS is an MPEG-2 Transport Stream (TS) that results from multiplexing an MPEG-2 standard video signal, a Dolby AC-3 standard voice signal, and the like. Here, the MPEG-2 TS includes a 4 byte header and a 184 byte payload.

In this manner, the signal, output from the demodulation unit 120 is input into the controller 170 and goes through inverse multiplexing and video/voice signal processing.

The signal input and output unit 130 is by a cable or wirelessly connected to an external apparatus, for example, a digital versatile disk (DVD) player, a Blu-ray disk player, a game apparatus, a camera, a videotape recorder, a notebook computer, a set-top box, a portable device, a smart phone and the like, and performs signal input and output operations. To do this, the signal input and output unit 130 includes an A/V input and output unit for connection to a cable network and a wireless communication unit for connection to a wireless network.

The A/V input and output unit includes an Ethernet port, a USB port, a Composite Video Banking Sync (CVBS) port, a composite port, an S-video port (analog), a Digital Visual Interface (DVI) port, a High Definition Multimedia Interface (HDMI) port, a Mobile High-definition Link (MHL) port, a RGB port, a D-SUB port, an IEEE 1394 port, a SPDIF port, a Liquid HD port, and the like. A digital signal, input through these, is transferred to the controller 150. At this time, an analog signal, input through the CVBS port and the S-VIDEO port, is converted into the digital signal by an analog-to-digital converter (not illustrated) and is transferred to the controller 150.

The wireless communication unit performs wireless Internet access. The wireless communication unit performs wireless Internet access by using wireless communication technologies, such as Wireless LAN (WLAN) (Wi-Fi), Wireless Broadband (Wibro), World Interoperability for Microwave Access (Wimax), and High Speed Downlink Packet Access (HSPPA). In addition, the wireless communication unit can perform short-range communication with a different electronic apparatus. For example, the wireless communication unit performs the short-range communication by using a short-range communication technology, such as Bluetooth, Radio Frequency Identification (RFID), Infrared Data Association (IrDA), Ultra Wideband (UWB), or ZigBee.

The signal input and output unit 130 connects to a predetermined web page over the wireless and cable networks and thus transmits the data to and from the server and additionally receives content or various items of data, for example, the content, such as movies, an advertisement, a game, VOD, and broadcast signals and various items of content-related information, which are provided by a content service provider or a network administer. The signal input and output unit 130 receives firmware update information and update files provided by the network administrator over the cable and wireless networks and receives an application selected by the user among application that are placed in a public domain.

The signal input and output unit 130 transfers an image signal, a voice signal, and the data signal that are provided by the external apparatus, to the controller 150. In addition, the signal input and output unit 130 transfers the image signal, the voice signal, and the data signal included in various media files stored in an external storage device, such as a memory device and a hard disk driver, to the controller 150. In addition, the signal input and output unit 130 transfers the image signal, the voice signal, and the data signal that are processed by the controller 150, to the external apparatus described above, or the different external apparatus.

For example, the signal input and output unit 130 is connected to the set-top box, for example, a set-top box for Internet Protocol TV (IPTV), through at least one of the ports described above, and performs the signal input and output operation. In addition, the signal input and output unit 130 transfers the image signal, the voice signal, and the data signal, which are processed by the set-up box for the IPTV in such a manner the image signal, the voice signal, and the data signal are available for bidirectional communication, to the controller 150, and transfers the signals processed by the controller 150 back to the set-up box for the IPTV. The IPTV here includes ADSL-TV, VDSL-TV, and FTTH-TV that are different depending on a transmission network. The IPTV includes TV over DSL, Video over DSL, TV over IP (TVIP), Broadband TV (BTV) and the like. In addition, the IPTV includes Internet TV and full browsing TV in which Internet connection is possible.

The digital signal, output from the signal input and output unit 130, also includes the stream signal TS. The stream signal TS, described above, is a signal that results from multiplexing the image signal, the voice signal, and the data signal.

The interface unit 140 transfers the signal, input by the user, to the controller 150, or transfers the signal transferred from the controller 150, to the user.

The interface unit 140 transfers a user input signal, input into a power key, a channel key, a volume key, a setting key and the like, to the controller 150. In addition, the interface unit 140 includes a sensing unit (not illustrated) for sensing a user gesture, a user location, a touch, and the like. To that end, the sensing unit includes a touch sensor, a voice sensor, a location sensor, a motion sensor, a gyro sensor, and the like. In such a case, the interface unit 140 transfers an input signal, input from the sensing unit, to the controller 150, or transmits the signal coming from the controller 150 to the sensing unit.

The interface unit 140 receives an input signal that the user inputs with the external input device 200, for example, the spatial remote controller, to perform power source control, channel selection, screen setting and the like, or transmits the signal processed by the controller 160 to the external input device 200. At this time, the interface unit 140 and the external input device 200 are connected to each other, by a cable or wirelessly.

In addition, the interface unit 140 receives personal information from the external input device 200 and/or receives information on a web server in connection by using the personal information. For example, if the mobile terminal approaches the external input device 200 within a predetermined distance and performs near field communication (NFC), the external input device 200 receives the personal information and others stored in the mobile terminal. The personal information here is information that is necessary to log on with a predetermined account before making a connection to the electronic apparatus or using the service.

The controller 150 controls general operation of the image display device 100. Specifically, the controller 150 generates or outputs a signal for the image or voice output by inversely multiplexing the stream signal TS that is received through the tuner 110, the demodulation unit 120, and/or the signal input and output unit 130 or by processing the inversely-multiplexed signals. For example, the controller 150 controls the tuner 110 in such a manner that the RF broadcast signal corresponding to the channel selected by the user or the already-stored channel is tuned.

The image signal image-processed by the controller 150 is transferred to the display unit 170 and an image corresponding to a resolution image signal is output. The voice signal processed by the controller 150 is transferred to the audio output unit 180 to output a sound. In addition, the image signal and/or the voice signal, which is processed by the controller 150, is input into an output device of the external apparatus through the signal input and output unit 130.

Although not illustrated in the drawings, the controller 150 includes, for example, an inverse multiplexing unit, an image processing unit, an On Screen Display (OSD) generation unit and a voice processing unit, a data processing unit, a channel browsing processing unit and others in order to generate or output the signal for the image or sound output by inversely multiplexing the stream signal TS or by processing the inversely-multiplexed signals.

The inverse multiplexing unit (not illustrated) inversely multiplexes the stream signal TS that is input. For example, if the MPEG-2 stream signal TS is input, the inverse multiplexing unit inversely multiplexes the MPEG-2 stream signal TS into the image signal, the voice signal, and the data signal. The stream signal TS here, as described above, is an output from the tuner 110, the demodulation unit 120, and/or the signal input and output unit 130.

The imaging processing unit (not illustrated) performs image processing, for example, decoding, on the inversely-multiplexed image signal. More specifically, the image processing unit decodes an MPEG-2 standard-encoded image signal by using an MPEG-2 decoder, and decodes an H.264 standard-encoded image signal according to Digital Multimedia Broadcasting (DMB) standard or Digital Video Broadcast-Handheld (DVB-H) standards by using an H.264 decoder. In addition, the image processing unit performs the imaging processing in such a manner that brightness, tint and color of the image signal are adjusted. In addition, the image processing unit performs scaling in such a manner that the inversely-multiplexed image signal can be output on the display unit 170. In this manner, the image signal, which is image-processed by the image processing unit, is transferred to the display unit 170 or transferred to an external output apparatus (not illustrated) through an external output port.

The OSD generation unit (not illustrated) generates an OSD signal depending on a user input or by itself. More specifically, the OSD generation unit generates a signal for displaying various items of information in the form of a graphic or a text on the screen of the display unit 170, for example, based on at least one of the image signal and the data signal or an input signal that is received from the external input device 200. The generated OSD signal includes various data, such as a user interface, various menu screens, a widget, and an icon that are provided on the image display device 100 and a pointer corresponding to a pointing signal that is transmitted from the external input device 200. In addition, the generated OSD signal includes a 2D object or a 3D object.

The controller 150 mixes the OSD signal that is generated by the OSD generation unit described above and the image signal that is image-processed and decoded by the image processing unit. The mixed image signal goes through a frame rate converter (FRC) to change its image frame rate. In addition, the mixed image signal goes through a formatter and is output with its image signal format being changed, or is separated into a 2D image signal and a 3D image signal for 3D image display or is converted from the 2D image signal into the 3D image signal.

The voice processing unit (not illustrated) performs voice processing, for example, decoding, on the inversely multiplexed voice signal. More specifically, the voice processing unit decodes the MPEG-2 standard-encoded voice signal by using the MPEG-2 decoder, decodes an MPEG-4 Bit Sliced Arithmetic Coding (BSAC) standard-encoded voice signal according to the DMB standards by using an MPEG-4 decoder, and decodes an MPEG2 advanced audio coded (AAC) standard-encoded voice signal according to satellite DMB standards or the Digital Video Broadcast-Handheld (DVB-H) standards by using an AAC decoder. In addition, the voice processing unit performs base processing, treble processing, and sound volume processing. The voice signal that is processed by the voice processing unit in this manner is transferred to the audio output unit 180, for example, a speaker, or is transferred to an external out device.

The data processing unit (not illustrated) performs data processing, for example, decoding, on the inversely multi-plexed voice signal. The data signal here includes electronic program guide (EPG) information including broadcast information, such as a broadcasting-starting time and a broadcasting-ending time of a broadcast program that is broadcast over each channel. The EPG information includes, for example, ATSC-program and System Information Protocol (ATSC-PSIP) in the case of ATSC standards and includes DVB-Service Information (DVB-SI) in the case of DVB. The ATSC-PSIP or the DVB-SI here is included in a header (4 byte) of the MPEG-2 stream signal TS.

The channel browsing processing unit (not illustrated) receives the stream signal TS, output from the demodulation unit 120, or the stream signal, output from the signal input and output TS unit 130, as an input, and extracts an image from it, thereby generating a thumbnail image. The generated thumbnail image, as it is, or as is encoded, is input into the controller 150. In such a case, the controller 150 displays a thumbnail list including the multiple thumbnail images on the display unit 170 by using the thumbnail image that is input. At this time, the thumbnail images in the thumbnail list are displayed on all the regions of the display unit 170, or are displayed one region of the display unit 270 in a manner that enables the thumbnail images to be easily viewable. In addition, the thumbnail images in the thumbnail list are sequentially updated.

On the other hand, the controller 150 performs signal processing on the analog baseband image/voice CVBS/SIF as well. For example, the analog baseband image and voice signal CVBS/SIF, input into the controller 150, is the analog baseband image and voice signal, output from the tuner 110 or the signal input and output unit 130. The controller 150 performs the control, in such a manner that the analog baseband image and voice signal CVBS/SIF that is input is processed, the signal-processed image signal is displayed on the display unit 170, and the signal-processed voice signal is output to the audio output unit 180.

In addition, the controller 150 controls operation of the image display device 100 with a user command, input through the signal input and output unit 130 or the interface unit 140, or with an internal program. More specifically, the controller 150 determines whether or not the external apparatus is connected, depending on the input of the personal information from the external input device 200, based on information on the adjacent external apparatus around the image display device 100, which is received from the signal input and an output unit 130 or the interface unit 140, and based on information on a channel over, a frequency at, and a code through which the different external apparatus can be remotely controlled, Then, the controller 250 displays an object indicating the external apparatus being connected, on the display unit 270.

In addition, the controller 150 displays at least one object that is to be displayed on the display unit 170, as a 3D object. For example, in addition to a Web screen (a newspaper, a magazine, and the like) in connection and an electronic program guide (EPG), the object here includes at least one of a menu of various items, a widget, an icon, a still image, a moving image, and a text.

In addition, the controller 150 detects a user gesture by analyzing individually or combinedly an image that is captured by an imaging device (not illustrated), a signal that is detected by a sensing unit (not illustrated), and an input signal that is transmitted by the external input device 200.

In addition, the controller 150 identifies a location of the user, based on the images captured by the imaging unit (not illustrated). For example, the controller 250 measures a distance (an X-axis coordinate) between the user and the image display device 100, and additionally measures an X-axis coordinate and a Y-axis coordinate within the display unit 170, which correspond to the location of the user.

The storage unit 160 stores a program for the signal processing and the control by the controller 150, and stores information on a predetermined broadcast channel through the use of the signal-processed image signal, the voice signal and the data signal, and a channel memory function such as generating a channel map writing. The storage unit 160 includes at least one of the following storage media: a flash memory, a hard disk, a multimedia card micro type, a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In addition, the storage unit 160 stores IR format key codes for controlling different external apparatuses, and stores IR format key database for multiple external apparatuses.

A display module is divided into a display unit 170 to which an image is output, and a bezel unit 175 that is formed along an edge of the display unit 170.

The image signal, the data signal, and the OSD signal that are processed by the controller 150, or the image signal, the data signal, and a control signal and others that are received from the signal input and output unit 130 or the interface unit 140 are converted into a RGB signal, and a drive signal is generated. Through this process, the resulting image is output to the display unit 170. The display unit 170 is realized in various forms as follows: a plasma display panel (PDP), a liquid crystal display (LCD), a thin film transistor-liquid crystal display (TFT-LCD), an organic light emitting diode (OLED), a flexible display, a 3D display, and an e-ink display.

For example, if the display unit 170 is a 3D display, this is realized as an add-on display type or as a sole display type that enables 3D image viewing. The sole display type is for the display unit 170 to solely realize a 3D image without a separate display, for example, without using eyeglasses. For example, the sole display type is categorized into a lenticular type and a parallax barrier type. In addition, the add-on display type is for the display unit 170 to realize the 3D image by using a 3D viewing device. For example, the add-on display type is categorized into a head-mounted display (HMD) type and an eyeglasses type.

In addition, if the display unit 170 is realized as being equipped with a touch screen-equipped touch screen, the display unit 170 functions as the input device as well as the output device.

The touch sensor is configured in such a manner as to convert a pressure applied to a specific portion of the display unit 170, a change in electrostatic capacitance occurring in a specific portion of the display unit 170, or the like into an electrical signal. The touch sensor is configured in such a manner as to detect the pressure that is applied to the touch sensor at the time of the touch, as well as a position and an area of the touch sensor that a touching object touches on. The touching object here is an object that applies the touch to the touch sensor, and includes for example, a finger, a touch pen or a stylus, a pointer and the like. If the touch input is applied to the touch sensor, a signal(s) corresponding to the touch input is sent to a touch controller. After processing the signal(s), the touch controller transmits the corresponding data to the controller 150. Accordingly, the controller 150 identifies which region of the display unit 170 is touched on.

The audio output unit 180 receives the voice signal processed by the controller 150, for example, a stereo signal or a 5.1 channel signal, as an input, and outputs a sound corresponding to the processed voice signal. To do this, the audio output unit 180 is realized as various types of speakers.

The image display apparatus 100 includes a camera 122 for photographing the use himself/herself or capturing an image of a photographic subject. One camera 122 is provided, but multiple cameras 122 may be provided. Image information obtained through the camera 122 is input into a controller 150, and thus the controller detects a user gesture based on a captured image.

In addition, the image display device 100 includes an image communication unit (not illustrated) that is configured to include a microphone (not illustrated) in addition to the imaging unit (not illustrated). The controller 150 signal-processes the information on the image captured by the imaging unit and information collected by the microphone and transmits the result of the signal processing to an image communication apparatus of the other party through the signal input and output unit 130 or the interface unit 140.

A power supply unit (not illustrated) supplies electric power throughout the image display device 100. Specifically, the power supply unit supplies electric power to the controller 150 realized in the System-On-Chip (SOC) form, the display unit 170 for displaying the image, and the audio output unit 180 for outputting audio.

To do this, the power supply unit (not illustrated) includes a converter (not illustrated) that converts DC power into AC power. On the other hand, for example, if the display unit 170 is realizes as a liquid crystal panel including multiple backlight lamps, the power supply unit further includes an inverter (not illustrated) in which a PWM operation is possible for brightness variability and dimming drive.

The external input device 200 is connected to the interface unit 140 by a cable or wirelessly and transmits the input signal that is generated according to the user input, to the interface unit 140. The external input device 200 includes a remote controller (for example, the spatial remote controller), a mouse, a keyboard, a wheel, and the like. The remote controller transmits the input signal to the interface unit 140 by using the communication technology such as Bluetooth, RF, Infrared Data Association (IrDA), Ultra Wideband (UWB), or ZigBee. If the external input device 200 is realized, specifically, as the spatial remote controller, the external input device 300 generates the input signal by detecting a movement of the main body.

On the other hand, the image display device 100 is realized as a fixed-type digital broadcast receiver or a mobile digital broadcast receiver.

If the image display device 100 is realized as the fixed type digital broadcast receiver, the image display device 100 is realized in such a manner as to receive at least one of the following broadcast types: digital broadcast to which to apply an ATSC type (8-VSB type) that uses a single carrier, digital broadcast to which to apply a ground wave DVB-T type (COFDM type) that uses multiple carriers, and digital broadcast in which to apply an ISDB-T type (BST-OFDM type) digital broadcast that allows for the use of different broadcast channel depending on a user authority.

If the image display device 100 is realized as the mobile digital broadcast receiver, the image display device 100 is realized in such a manner as to receive at least one of the following broadcast types: digital broadcast to which to apply a ground wave DMB type, digital broadcast to which to apply a satellite DMB type, digital broadcast to which to apply an ATSC-M/H type, digital broadcast to which to apply a Digital Video Broadcast-Handheld (DVB-H) type, and digital broadcast to which to apply a Media Forward Link-Only type.

On the other hand, the image display device 100 is realized as the digital broadcast receiver for cable communication, satellite communication or IPTV.

In addition, the image display apparatus 100 described above is applied to the mobile terminal as well. The mobile terminal includes a mobile phone, a smart phone, a laptop computer, a digital-broadcast-dedicated terminal, a personal digital assistant (PDA), a portable multimedia player (PMP), a navigation system, a slate PC, a tablet PC, a high-end subnotebook and the like.

The image display device, when used as the mobile terminal, further includes the wireless communication unit in addition to the configuration described above. The wireless communication unit enables wireless communication between the mobile terminal and a wireless communication system or between the mobile terminal and a network within which the mobile terminal is located.

To this end, the wireless communication unit includes at least one of a broadcast receiving module, a mobile communication module, a wireless Internet module, a short-range communication module and a positional information module.

The broadcast receiving module receives a broadcast signal and/or broadcast related information from a broadcast administrative server over a broadcast channel.

The broadcast channel here includes a satellite channel, a ground wave channel and the like. In addition, the broadcast administrative server means a server that generates and transmits the broadcast signal and/or the broadcast-related information or a server that receives the generated broadcast signal and/or the generated broadcast-related information and transmits them to the mobile terminal. The broadcast signal here includes not only a TV broadcast signal, a radio broadcast signal, and a data broadcast signal, but also a broadcast signal in the form of a combination of the TV broadcast signal or the radio broadcast signal and the data signal.

The broadcast-related information means broadcast-channel-related information, a broadcast program or a broadcast service provider. The broadcast-related information is provided over a mobile communication network. In addition, the broadcast-related information comes in various forms. For example, the broadcast-related information comes in the form of an electronic program guide in Digital Multimedia Broadcasting (DMB), or an electronic service guide in Digital Video Broadcast-Handheld (DVB-H).

The broadcast receiving module receives the digital broadcast signal by using the following TV standards: Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management system (MBBMS), and Integrated Services Digital Broadcast-Terrestrial (ISDB-T). Of course, the broadcast receiving module is configured in such a manner that it is suitable not only for a digital broadcasting system described above, but also for other broadcasting systems.

The broadcast signal and/or the broadcast-related information that are received through the broadcast receiving module are stored in the memory.

The mobile communication module transmits a wireless signal to and from at least one of a base station an external terminal, and a server over a mobile communication network. The wireless signal includes a voice call signal, a video telephone call signal or various forms of data involved in the transmitting and receiving of a text/multimedia message.

The mobile communication module is configured to realize a videotelephony mode and a voice telephony mode. The videotelephony mode refers to a mode in which the user is engaged in a voice conversation with real-time viewing of the other party's image being enabled, and the voice telephony mode refers to a mode in which the user is engaged in the voice conversation with the real-time viewing of the other party's image being disabled.

The mobile communication module is configured to transmit and receive at least one of voice and video to realize the videotelephony mode and the voice telephony mode. The wireless Internet module is a module for wireless Internet access and is built into or provided independently of the mobile terminal. To provide the wireless Internet access, Wireless Internet technologies are used such as Wireless LAN (WLAN), Wireless Fidelity (WiFi) Direct, (Digital Living Network Alliance (DLNA), Wireless broadband (Wi-bro), World Interoperability for Microwave Access (Wi-max), High Speed Downlink Packet Access (HSDPA), GSM, CDMA, WCDMA, and Long Term Evolution (LTE).

The short-range communication module refers to a module for short-range communication. To provide the short-range communication, short-range communication network technologies are used such as Bluetooth, Radio Frequency Identification (REID), Infrared Data Association (IrDA), Ultra Wideband (UWB), ZigBee, Near Field Communication (NFC), and WiFi Direct.

The positional information module is a module for obtaining a location of the mobile terminal and its typical example is a Global Position System (GPS) module or a WiFi (Wireless Fidelity (WiFi) module.

Figure 2:
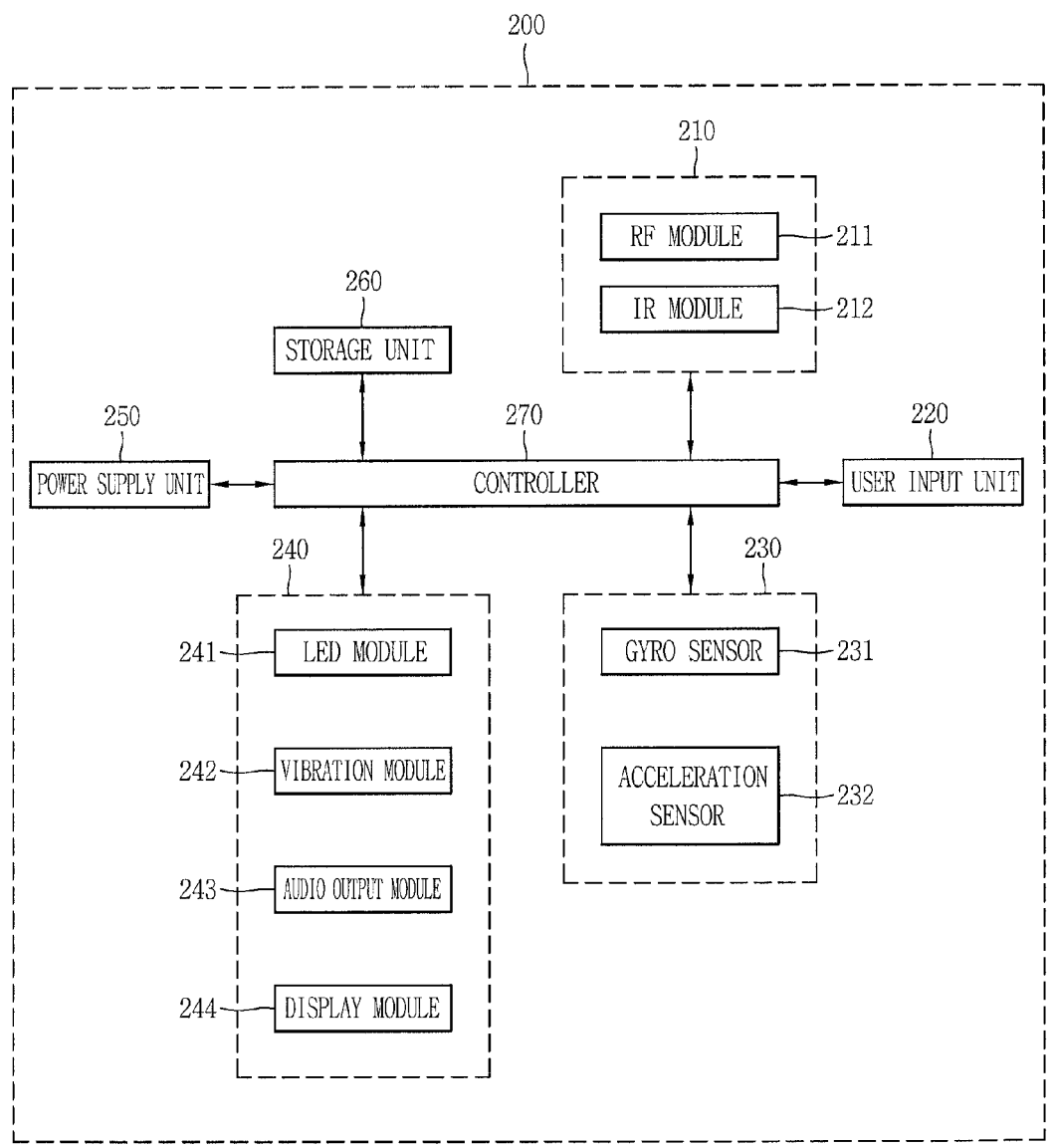
FIG. 2 is a block diagram illustrating in detail the external input device in FIG. 1.

FIG. 2 is a block diagram illustrating in detail the external input device 200 in FIG. 1. The external input device 200 is configured to include a wireless communication unit 210, a user input unit 220, a sensing unit 230, an output unit 240, a power supply unit 250, a storage unit 260 and a controller 270.

Referring to FIG. 2, the wireless communication unit 210 transmits a signal to and from the image display device 100. To that end, the wireless communication unit 210 includes an RF module 211 and the IR module 212. The RF module 211 transmits the signal transmit to and from the interface unit 140 of the image display device 100 according to RF communication standards. The IR module 212 transmits the signal to and from the interface unit 140 of the image display device 100 according to IR communication standards. For example, the wireless communication unit 210 transmits a signal including information on a movement of the external input device 200 to the image display device 100 through the RF module 211.

On the other hand, the external input device 200 further includes an NFC module (not illustrated) for a short-range magnetic field communication with the predetermined external apparatus. Through the short-range magnetic field communication with the external apparatus, the external input device 200 receives personal information and information on a Web server that is accessed with the personal information and transmits the received information to the image display device 100 through the RF module 211 or the IR module 212.

In addition, the external input device 200 transmits the signal to the interface unit 140 of the image display device 100 by using the communication technology such as Bluetooth, Infrared Data Association (IrDA), Ultra Wideband (UWB), ZigBee), and short-range magnetic field communication (NFC).

The external input device 200 receives the image, the voice, or the data signal that is output from the interface unit 140 of the image display device 100. Then, based on the image, the voice, or the data signal that is received, the external input device 200 displays it on the image display device 100 or outputs it as audio.

In addition, the external input device 200 receives from the adjacent external apparatus information on the different external apparatus and information on the channel over, the frequency at, and the code through which the different external apparatus can be remotely controlled. Based on such information on the different external apparatus, the external input device 200 assigns the channel, the frequency, or the code to the corresponding external apparatus and performs remote control.

The user input unit 220 includes an input unit such as a keypad, a key button, a touch screen, a scroll key, and a jog key. The user operates the user input unit 220 to input a control command associated with the image display device 100. The user inputs such a control command, for example, by pushing down the key button of the user input unit 220. In addition, for example, if the user input unit 220 is equipped with the touch screen, the user inputs the control command by touching on a soft key of the touch screen.

The user input unit 220 includes, for example, an okay key, a menu key, a direction control key, a channel tuning key, a volume adjustment key, a return key, and a home key. The okay key (not illustrated) is used to select a menu or an item. The menu key (not illustrated) is used to display a predetermined menu. The direction control key is used to move a pointer or an indicator displayed on the display unit 170 of the image display device 100, upward, downward, leftward, and rightward. In addition, the channel tuning key (not illustrated) is used to tuning in on a specific channel. The volume adjustment key (not illustrated) is used to adjust the volume in such a manner as to make it be down low or up high. In addition, the return key (not illustrated) is used to move back to the previous screen. The home key (not illustrated) is used to move to a home screen.

A confirmation key is configured to additionally have a scrolling function. To do this, the confirmation key is configured to take the form of a wheel key. Accordingly, the user can push on the confirmation key upward and downward or leftward and rightward to select a corresponding menu or item, and can rotate a mounted wheel forward and backward to scroll through a screen being output to the display unit 170 of the image display apparatus 100 or to switch a current list page to the next one. For example, if a screen that has been output to the display unit 170 is displayed partially, not in its entirety, the user can scroll the wheel of the confirmation key to search for a desired portion of the screen. Thus, portions of the screen that have not been displayed on the display unit 170 are displayed on the display unit 170. As another example, if a list page is displayed on the display unit 170, the user can scroll the wheel of the confirmation key to display a page that precedes or follows a current page that is displayed on the display unit 170. As another example, if a specific function is selected, the user can scroll the wheel of the confirmation key to increase/decrease a setting value corresponding to the specific function. In addition, a separate key may be provided to perform the scrolling function of the confirmation key.

The sensing unit 230 includes a gyro sensor 231 and an acceleration sensor 232. The gyro sensor 231 senses a spatial movement of the external input device 200 in terms of an X-axis, a Y-axis, and a Z-axis. The acceleration sensor 232 senses a moving speed of the external input device 200.

In addition, the sensing unit 230 further includes a distance measurement sensor to sense a distance from the display unit 170.

The output unit 240 outputs information that depends on operation of the user input unit 220 and information corresponding to a transmission signal of the image display device 100. The user recognizes an operation state of the user input unit 220 or a control state of the image display device 100 through the output unit 240. The output unit 240 includes an LED module 241, a vibration module 242, an audio output module 243, and a display module 244. The LED module 241 emits light, the vibration module 242 generates vibration, an audio output module 243 outputs sound, and a display module 244 displays an image, in response to the operation of the user input unit 220 or a signal transmitted and received through the wireless communication unit 210.

The power supply unit 250 supplies electric power to various electronic elements of the external input device 200. If the external input device 200 is not moved for a predetermined time, the power supply unit 250 stops supplying the electric power to reduce power consumption. When a predetermined key is operated, the power supply unit 250 resumes the supplying of the electric power.

The storage unit 260 stores various programs, applications, and frequency bandwidth information that are associated with the control and the operation of the external input device 200. In addition, the storage unit 260 stores IR format key codes for controlling the different external apparatuses with an IR signal, and stores IR format key database for the multiple external apparatuses.

The controller 270 generally controls what is associated with the control of the external input device 200. The controller 270 transmits a signal corresponding to the operation of the predetermined key of the user input unit 220 to the image display device 100 through the wireless communication unit 210. In addition, the controller 270 transmits the signal corresponding to the movement of the external input device 200 that is sensed by the sensing unit 230 to the image display device 100 through the wireless communication unit 210. The image display device 100 calculates coordinates of the pointer corresponding to the movement of the external input device 200.

Figure 3:
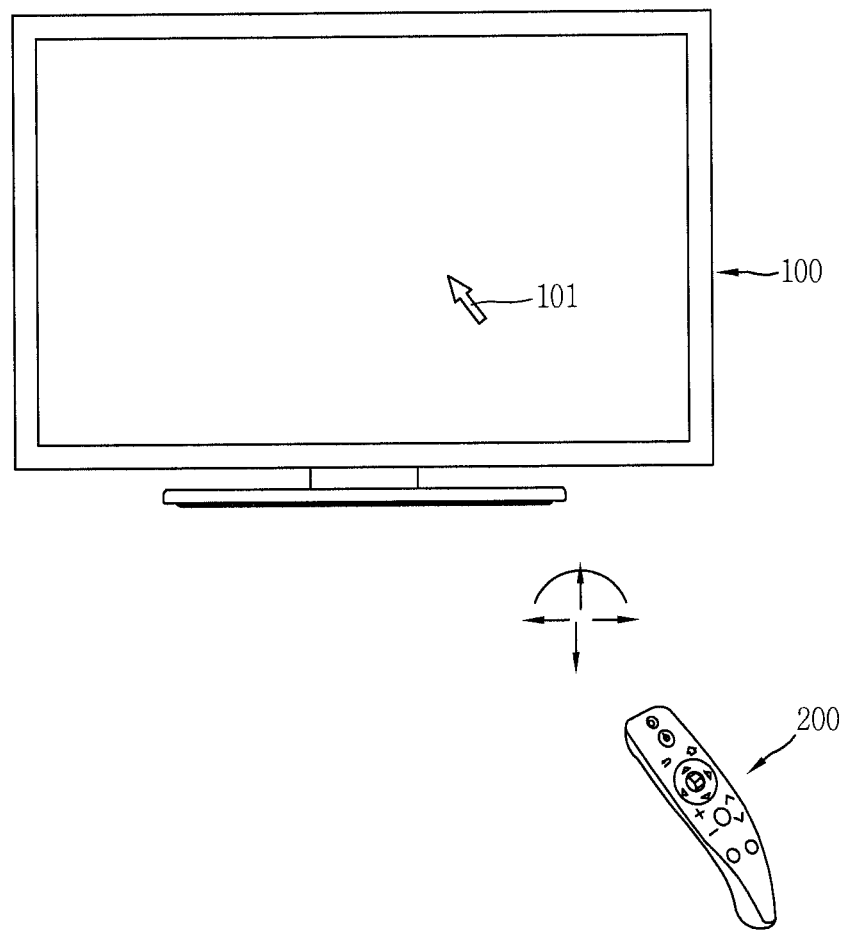
FIG. 3 is a diagram illustrating that the image display apparatus according to the present invention and the external input device operate in conjunction with each other.

FIG. 3 is a diagram illustrating that the image display apparatus 100 according to the present invention and an external input device 200 operate in conjunction with each other. Here, for the sake of description, a TV set is illustrated as an example of the image display apparatus 100 and a spatial remote controller is illustrated as an example of the external input device 200.

Referring to FIG. 3, the external input device 200 transmits a signal to and from the image display apparatus 100 in accordance with the RF communication standards. A control menu is displayed on a screen of the image display apparatus 100 according to a control signal of the external input device 200. To do this, the external input device 200 includes multiple buttons and generates an external input signal according to operating of the button by the user. In addition, the external input device 200 transmits information on a spatial 3D movement of the external input device 200, which is detected through the sensing unit, to the image display device 100.

In FIG. 3, a pointer 101 corresponding to a movement of the external input device 200 is displayed on the screen of the image display device 100, in response to the user's moving or rotating the external input device 200 upward and downward, leftward and rightward, or backward and forward. The external input device 200 is called a spatial remote controller because the corresponding pointer 101 is displayed on the image display device 100 while moving according to a spatial 3D movement.

Information on the movement of the external input device 200 that is detected through the sensing unit of the external input device 200 is transmitted to the image display apparatus 100. Then, the image display device 100 calculates x and y coordinates of the corresponding pointer from the information on the movement of the external input device 200. The pointer 101 corresponding to the calculated x and y coordinates is displayed on the image display apparatus 100.

On the other hand, when the user moves the external input device 200 away from the screen of the image display device 100 while pushing down a predetermined button provided on the external input device 200, a selection region within the screen that corresponds to the pointer 101 displayed on the screen is zoomed in (or zoomed out) and thus is displayed in an enlarged (or reduced) state. In contrast, when the user moves the external input device 200 closer to the screen of the image display device 100, the selection region within the screen that corresponds to the pointer 101 displayed on the screen is zoomed output (or zoomed in) and thus is displayed in a reduced (or enlarged) state.

On the other hand, in a state where a predetermined button provided on the external input device 200 is pushed down, the upward/downward and leftward and rightward movements of the external input device 200 are not recognized. That is, if the external input device 200 is moved away from or closer to the screen of the image display device 100, the upward and downward and leftward and rightward movements are not recognized, but only the forward and backward movements are recognized.

In addition, a moving speed and a moving direction of the pointer 101 displayed on the image display device 100 and a scrolling speed of the screen according to the movement are determined depending on a moving speed and/or a moving direction of the external input device 200. Here, in addition to the form of an arrow illustrated in FIG. 3, the pointer 101 is configured to take the form of an object, such as a dot, a cursor, a prompt, and an outline.

An image object of which a function is activated by a pointing signal received from the external input device 200 is displayed on one region of the display unit 170 of the image display apparatus 100 described above according to an embodiment of the present invention. Then, when it is detected that the displayed image object moves in a predetermined pattern, following a pointing signal, the controller 150 of the display apparatus 100 activates an application corresponding to a detected moving pattern. A screen for controlling an external apparatus, corresponds to the activation of the application, is output to one region of the display unit 170.

Accordingly, while viewing an image through the display unit 170, the user can conveniently control operation of the external apparatus using the control screen being output.

The moving pattern of the image object for activating an application means a movement of the spatial remote controller that is recognized as the user's intentional inputting of a control command for activating a specific application. For example, the moving pattern means ways in which an image of a specifically-shaped object is drawn within the display unit 170, the image object moves continuously at least in different directions, or the image object moves to a predetermined region of the display unit 170, or to a specific point on the display unit 170. The moving pattern is set or is changed through a user input.

In addition, the predetermined application here is an application program that runs in order for at least one external apparatus and the image display apparatus 100 to operate in conjunction with each other. The predetermined application may be pre-installed on the image display apparatus 100 or may be downloaded from a web server.

In addition, here, the activation of an application means that in the image display apparatus 100, when the image object moves in a predetermined pattern, the application that is already executed, but maintains an inactivated state, switches to an activated state. In addition, the activation of the application means that at a point in time when the image object moves in the predetermined pattern, a predetermined application is executed.

In addition, multiple applications may be activated. Accordingly, if the image object moves in different patterns, different applications are activated. For example, when the image object moves in a predetermined first pattern within the display unit 170, an application associated with a lighting apparatus is activated. When the image object moves in a predetermined second pattern, an application associated with control of an air conditioner is activated.

In addition, the external apparatus here means a smart apparatus that includes a communication module in order to operate through wired/wireless network communication, as at least one, among a lighting apparatus, a household appliance, a mobile terminal, an image apparatus, a temperature/humidity control apparatus, a massager apparatus, and an audio apparatus. On the other hand, multiple light apparatuses, as examples of the external apparatus that conjunctionally operates through the activation of an application, are described below, but the external apparatus is not limited to these. The present invention, of course, may be realized through the household appliances or the electronic apparatus described above.

Specifically, for example, when a predetermined application is activated according to the movement of the image object in a predetermined pattern within the display unit 170, the image display apparatus 100 operates in conjunction with at least one lighting apparatus through the activation of the application. Then, the control screen for controlling the conjunctionally-operating lighting apparatus is output to one region of the image display apparatus 100. Then, as described in detail below, the user can control operation of the conjunctionally-operating lighting apparatus using the control screen that is output to the display unit 170, while viewing the image. In addition, according to the present invention, types of content or context information that is output to the image display apparatus 100, and an image setting value are analyzed and thus an operational mode of the lighting apparatus suitable for a viewing environment is recommended through the control screen.

As described above, according to the present invention, the user can control operation of apparatuses in the neighborhood, for example, the lighting apparatuses, which operate in conjunction with the image display apparatus, in a convenient, intuitive manner, on a large-scale screen, using the external input device such as the spatial remote controller, while viewing the image that is output to the image display apparatus 100.

A method of operating the image display apparatus according to the embodiment of the present invention is described in more detail below referring to FIGS. 4 and 5A to 5C.

Referring to FIG. 4, first, a step of outputting at least content screen to the display unit 170 of the image display apparatus 100 proceeds (S410). Here, there is no limit to types of the content screens that are output to the display unit 170. For example, the content screens include a background screen of an object, a broadcast screen, a moving image/audio reproduction screen, an application execution screen, a wen application execution screen, a moving image, a word processing screen, a game screen, and a pre-stored image.

Next, the image display apparatus 100 receives the pointing signal from the external input device 200 (S420), and outputs an image object corresponding to the received pointing signal on the content screen.

Here, the spatial remote controller, as the external input device 200 is described, but the external input device 200 is not limited to this. The external input device 200 may be a different external apparatus that is capable of performing the same function as that of the spatial remote controller or a function similar to that of the spatial remote controller, or may be a mobile terminal on which such an application is installed and which is capable of transmitting an IR signal. For the sake of description, the external input device is hereinafter referred to as a spatial remote controller 200.

The pointing signal that is transmitted from the spatial remote controller 200 means a value that is output as a result of detecting a movement through a gyro sensor 231 or an acceleration sensor 232 of the spatial remote control 200. The pointing signal means an input signal value that is input through a different input device, for example, a touch pad, a track ball, a track pad, or the like, which is provided to the spatial remote controller 200.

Specifically, the touch pad activates the pointer signal according to pressure that, when a user's finger or a pen comes into contact with a pad, is applied to the pad, or according to a movement of the user's finger or the pen across the pad.

In addition, a ball provided to the trackball of the spatial remote controller 200 is rolled with a user's hand to move the image object that is displayed on the display unit 170 of the image display apparatus 100, or to control a different icon displayed on the display unit 170. In addition, the track pad moves the image object that is displayed on the display unit 170, based on a movement detected through the input by the finger, the pen or the like, or through static electricity.

On the other hand, the image object corresponding to the pointing signal received from the spatial remote controller 200 means a dot, a cursor, an arrow, a prompt, or an image of an object in the predetermined shape, which moves in a manner that corresponds to a moving direction and a moving speed of the received pointing signal. The controller 150 applies, in real time, the moving direction and the moving speed of the pointing signal received from the spatial remote controller 200 and a type of a signal to the image object and displays the resulting image object. On the other hand, the image object is displayed according to the pointing signal that is received from the spatial remote controller 200 and thus is hereinafter referred to as a "pointer."

On the other hand, the pointing signal received from the spatial remote controller 200 is triggered if pressure is applied to a specific key or an arbitrary key provided to the spatial remote controller 200. That is, the pointing signal is activated if a predetermined starting signal is input into the spatial remote controller 200.

Next, the image display apparatus 100 detects whether the image object that is displayed on the content screen according to the received pointing signal, that is, the pointer, moves in a predetermined pattern (S430).

The predetermined pattern here may be a specific pattern that is formed by a path along which the pointer displayed on the display unit 170 moves within a predetermined time. In addition, the predetermined pattern may be a pattern in which the pointer stays on a specific region of, or a specific point on the display unit 170 for a predetermined time. The moving pattern is set or is changed through the user input.

Specifically, if a moving path is created in which the pointer moves in a straight line direction toward the bezel unit 175 that is formed along a front side edge of the display unit 170 and then changes its moving direction and enters into a predetermined region, the controller 150 of the image display apparatus 100 recognizes that the pointer moves in the predetermined pattern. That is, if an operation in which the pointer moves close to the bezel unit 175 that meets a right-side border region of the display unit 170 and then bounces from there is displayed, it is recognized that the pointer moves in the predetermined pattern.

Figure 5A:
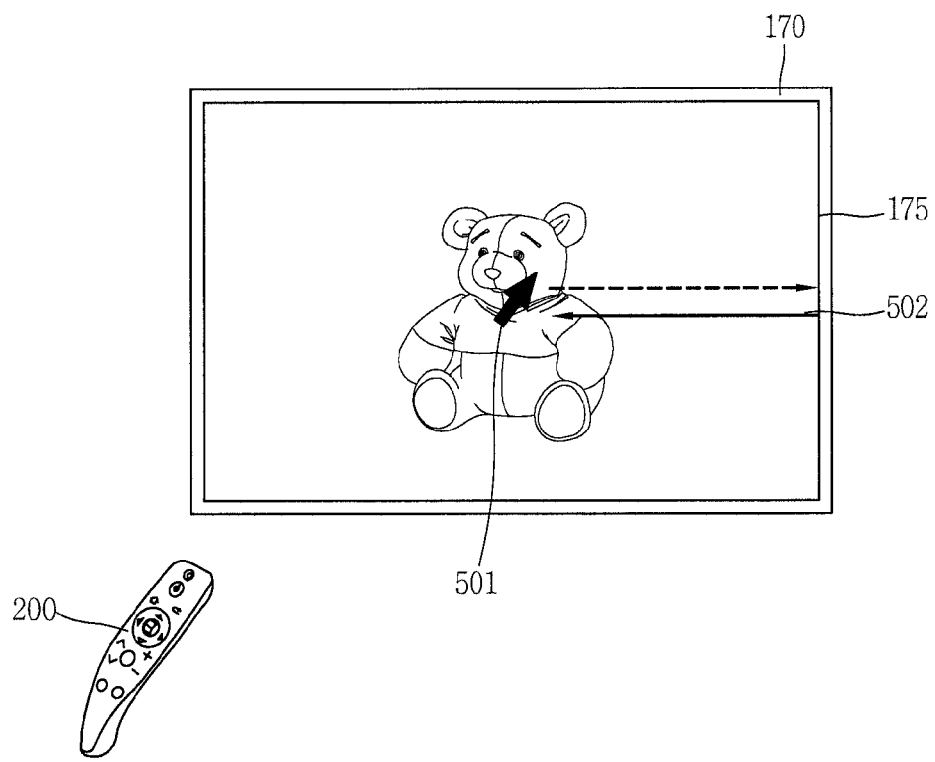
FIGS. 5(a), 5(b) and 5(c) are diagrams for describing the flowchart in FIG. 4.

For example, as illustrated in FIG. 5A, in a state where a content screen 501 is output to the display unit 170 of the image display apparatus 100, a pointer 501 that is displayed according to the movement of the spatial remote controller 200 is displayed on a content screen 502. At this time, when the user moves the spatial remote controller 200 rightward and leftward, for example, when the moving pattern is detected in which the pointer 501 moves rightward up to a border point adjacent to the bezel unit 175 and then returns back leftward, the controller 180 executes a control command corresponding to the moving pattern of the detected pointer.

However, the moving pattern of the pointer 501 is not fixed, and, by the user input, is set to be a different moving pattern or is changed to the different moving pattern. For example, if the moving is detected in which the pointer 501 draws a "rectangle" in a manner that approaches four corners of the display unit 170, a predetermined application is activated as described below. In this case, the user maintains security in such a manner that an application that is predetermined by the third party is not arbitrarily activated, by setting a moving pattern specific to himself/herself.

In addition, the controller 150 performs control in such a manner that a different control command is executed according to the number of times that the pointer 501 moves rightward up to the border point adjacent to the bezel unit 175 and then returns back leftward.

For example, if the number of times of round trip that the image object 501 moves up to the border point adjacent to the bezel unit 175 and then returns back leftward is 1, icons of a predetermined application can be configured to be output. If the number of times of round trip increases to 2, a predetermined application that is disclosed according to the present invention can be configured to be activated with the pre-output icons disappearing.

In addition, in a state where pressure is applied to an arbitrary key provided to the spatial remote controller 200, only if the pointing signal is received, the controller 150 may impose an limitation in such a manner as to determine whether the moving path of the pointer described above is matched to a predetermined pattern. Accordingly, one portion of the content screen that is currently output to the display unit 170 is prevented from being covered and being changed due to the unintended movement of the spatial remote controller 200 by the user.

In addition, if the pointer moves to such an extent that similarity to a predetermined moving pattern is a reference value or above, the controller 150 outputs guide information relating to the moving pattern of the pointer to one region of the display unit 170.

For example, if the pointer 501 moves rightward up to the border point adjacent to the bezel unit 175, the controller 180 outputs a message, for example, "Move the pointer leftward to execute a lighting apparatus application," or an arrow image indicating a leftward direction from a position of the pointer, to one region, for example, a lower right side of the display unit 170.

In this manner, if the moving path of the pointer is in a predetermined pattern, the controller 150 activates a predetermined application associated with the control of at least one external apparatus, and outputs the control screen corresponding to the activation of the application to one region of the content screen (S440).

Here, the activation of the application, as described above, means that in the image display apparatus 100, when the pointer moves in a predetermined pattern, a specific application that is already executed, but maintains an inactivated state, switches to an activated state. In addition, the activation of the application means that a predetermined application is executed only at a point in time when the image object moves in a predetermined pattern. In this manner, when a predetermined application is activated, the image display apparatus 100 operates in conjunction with at least one external apparatus, for example, the multiple lighting apparatuses, through the activated application.

Here, the conjunctional operating of the image display apparatus 100 and the multiple lighting apparatuses means a state where the image display apparatus 100 can communicate with the multiple lighting apparatuses through the activated application. For example, the multiple lighting apparatuses operate based on types, reproduction time, and an image setting value of the content screen that is output to the image display apparatus 100, and a sensor value that is detected through the sensors being provided, and operating states of the lighting apparatuses are displayed on the image display apparatus 100.

In this manner, according to the present invention, the image display apparatus 100 and the multiple lighting apparatuses are made to operate in conjunction with one another, by moving the spatial remote controller 200 in leftward, rightward, upward, and backward directions.

In addition, when the image display apparatus 100 and the lighting apparatuses operate in conjunction with one another through a predetermined application (for example, a lighting apparatus control function application), the controller 150 outputs a predetermined alarm corresponding to the conjunctional operation. The alarm is output in the form of audio, a message, or an image, which alerts the user to the conjunctional operation.

In addition, according to the present invention, the control screen for controlling the multiple lighting apparatuses is output to the display unit 170 in such a manner that the user directly controls the multiple lighting apparatuses.

Specifically, the controller 150 performs control in such a manner that the control screen is displayed, in a gradually-superimposed manner, on one region of the content screen that is output to the display unit 170, at a time in point when it is detected that the image object moves in a predetermined pattern.

To do this, the display unit 170 includes a virtual region corresponding to the region to which the control screen is output.

Figure 5B:
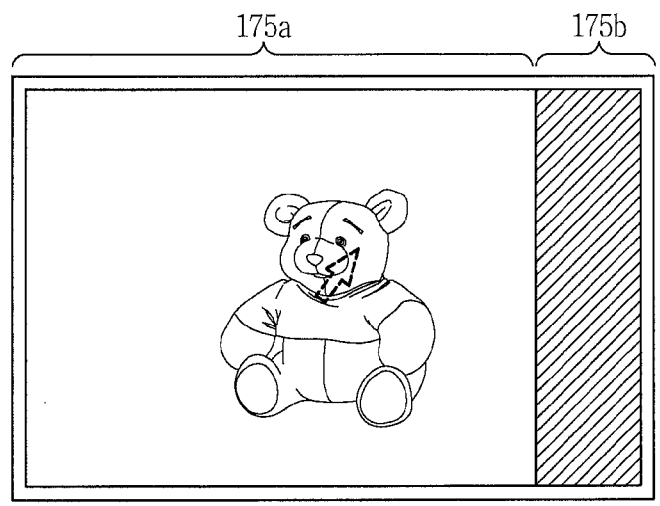
Figure 5C:
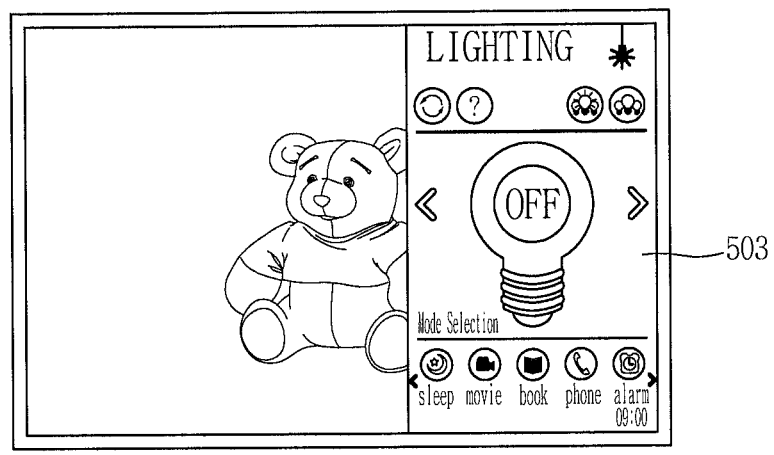

For example, as illustrated in FIG. 5B, a virtual region 175b is gradually formed along the moving path of the pointer 501, with an edge of the display unit 170 serving as a starting point. Then, as illustrated in FIG. 5C, a control screen 503 for the lighting apparatus is output to the virtual region 175b. The user can perform precise, tailored control on the lighting apparatuses using the control screen 503 being output.

In addition, here, the virtual region corresponding to the region to which the control screen is output is made to be in contact with the screen region to which only the content screen is output and with the bezel unit 175, and is formed to have a smaller size than the screen region.

In addition, the control screen is formed to gradually appear from one side of the virtual region in contact with the bezel unit 175 and to gradually cover one portion of the content screen that is output to the screen region. In this case, as the controls screen gradually appears, a size of the content screen is resized as much as the screen region is reduced and the resulting content screen is displayed. Accordingly, the user can control the lighting apparatus and the like, without a covered portion of the content screen preventing him/her from viewing the image.

On the other hand, if the image display apparatus 100 does not include the bezel unit 175, an edge of the display unit 151 is substituted for the bezel unit 175.

In addition, here, the control screen 503 includes images indicating a position of the conjunctionally-operating lighting, and an operating state, a dimming level, and the like of the lighting apparatus, and various menu items associated with the control of the lighting apparatus. This is described in more detail below referring to FIGS. 8A(a) to 8C(b), and 9A(a) to 9D(b), and 10A(a) to 10B(c).

On the other hand, if a predetermined application, for example, an control function application for the lighting apparatus is executed for the first time, the control screen 503 becomes a gateway search screen for conjunctional operating of the image display apparatus 100 and a lighting apparatus 300. In this case, if a gateway for the conjunctional operation is selected, changing to the control screen, which includes the images indicating the position of the conjunctionally-operating lighting apparatus, and the operating state and the dimming level of the lighting apparatus, and the various menu items associated with the lighting apparatus, takes place.

Figure 6A:
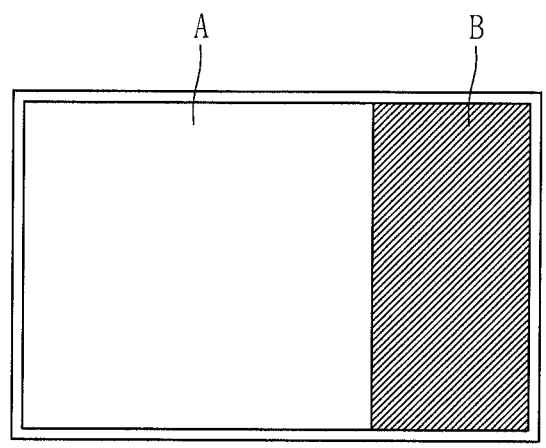
FIGS. 6A(a), 6A(b), 6A(c), 6A(d), 6B(a), 6B(b),6B(c), and 6B(d) illustrate various examples of virtual regions to which a control screen for an external apparatus is output according to the embodiment of the present invention.
Figure 6A:
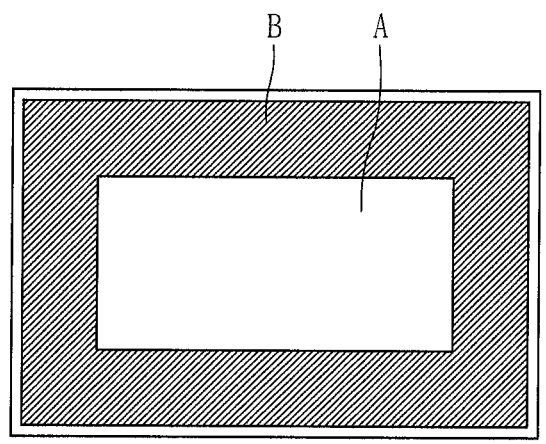
Figure 6A:
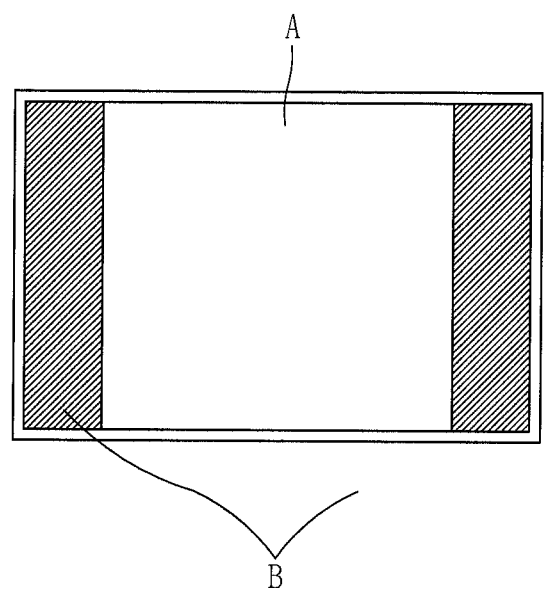
Figure 6A:
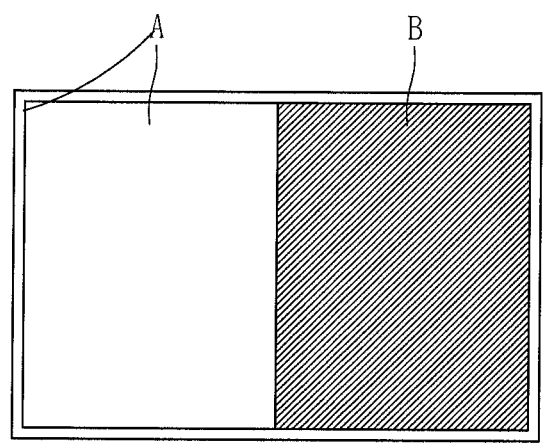

FIGS. 6A(a) to 6A(d) and 6B(a) to 6B(d) illustrate various example of the virtual regions to which the control screen for the external apparatus is output according to the embodiment of the present invention.

Specifically, referring to FIGS. 6A(a) to 6A(d), the display unit 170 of the image display apparatus 100 is divided a virtual region B to which the control screen is output and a region A to which only the content screen is output. At this time, the virtual region B, as illustrated, is formed in a right-side region of the display unit 170(*a*), is formed in a rectangular edge region along the edge of the display unit 170(*b*), or is formed in each of left-side and right-side regions of the display unit 170(*c*). In addition, the virtual region B and the region A to which only the content screen is output are formed in a manner that are distinguishedly asymmetrical with respect to the center line (a, b, and c) or are formed in a manner that are distinguishedly symmetrical with respect to the center line (d).

On the other hand, the controller 150 determines the virtual region to which the control screen is to be output, based on the moving path of the pointer.

For example, as illustrated in FIG. 6A(b), if the virtual region is formed in the rectangular edge region along the edge of the display unit 170, when the pointer moves leftward from the region A up to the end of the region B and then returns back to the region B, the control screen for the lighting apparatus is output to the region B formed on the left-side edge of the display unit 170.

Figure 6B:
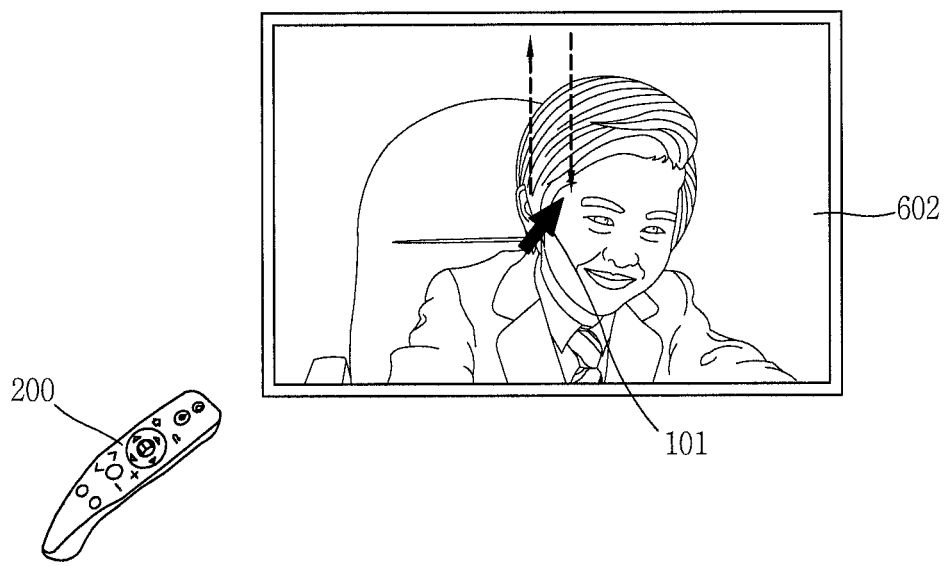
Figure 6B:
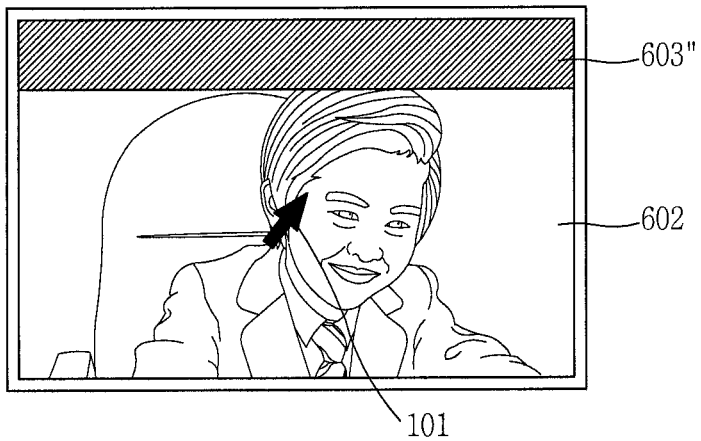
Figure 6B:
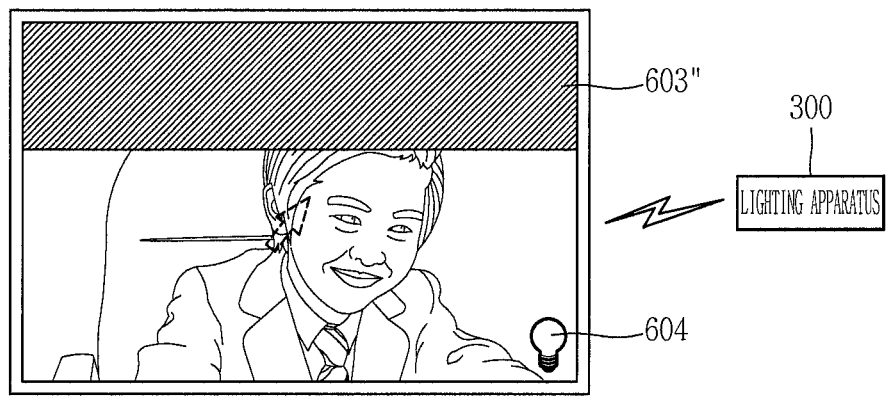
Figure 6B:
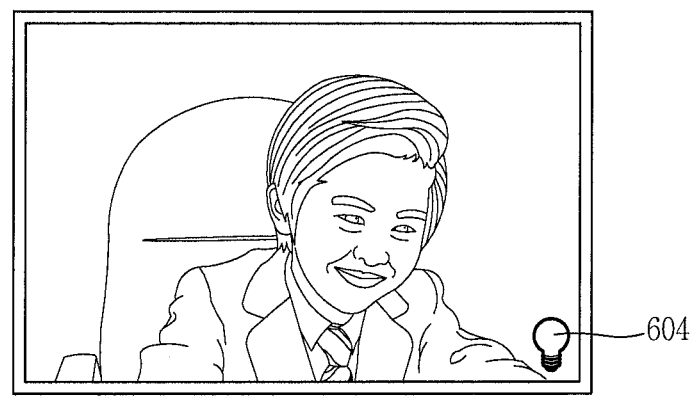

In addition, if the virtual region is formed as illustrated in FIG. 6A(b), when the moving path is created in which, as illustrated in FIG. 6B(a), under the control of the spatial remote controller 200, the pointer 101 moves upward form the region A, enters into the region B, and then returns back to the region B, the control screen, as illustrated in FIG. 6B(b), is gradually output to a region B 603" that is formed on the upper edge of the display unit 170. Accordingly, the control screen for the lighting apparatus is output to the region B 603" and through the control screen, the image display apparatus 100 and the multiple lighting apparatuses 300 operate in conjunction with one another. At this time, as illustrated in FIG. 6B(c), an icon 604 altering the user to the operating in conjunction with the lighting apparatus 300 is output to one region, for example, the lower right-side region of the display unit 170. Here, the icon 604 is illustrated as a thumbnail image indicating the lighting apparatus, but is not limited to this. The icon 604 may be realized as a different image alerting the user to the operating in conjunction with the lighting apparatus 300, or as a text form.

In addition, as illustrated in FIG. 6A(b), if the virtual region is formed in the rectangular edge region along the edge of the display unit 170, the controller 150 outputs different control screens to different four portions of the rectangular edge region, respectively. For example, if the pointer moves leftward from the region A, moves up to the end of the region B, and the returns back to the region A, the control screen for the lighting apparatus is output to the region B that is formed on the left-side edge of the display unit 170. If the pointer moves rightward from the region A, moves up to the end of the region B, and then returns back to the region A, a control screen for an air conditioner is output to the region B that is formed on the right-side edge of the display unit 170.

In addition, the controller 150 determines a size of the virtual region to which the control screen is to be output, based on the extent to which the moving path of the pointer is extended. For example, the size of the control screen that is output to the region B varies in proportion to the extent to which the moving path is extended after the pointer enters from the region B into the region A. At this time, a minimum value of the control screen (for example, one half of the region B illustrated in FIG. 6A(a)) and a maximum value (for example, the entire region B illustrated in FIG. 6A(a)) are predetermined.

In addition, when determining whether or not the control screen is output, the controller 150 uses a determination reference that varies with the moving speed of the pointer. For example, if the moving path of the pointer is matched to a predetermined pattern, but the moving speed is greater than a reference value, there is a likelihood that this will result from the unintended movement of the spatial remote controller 200. Thus, a message asking whether or not to output the control screen for the lighting apparatus is made to pop up on one region of the display unit 170. In such a case, the image display apparatus 100 outputs the control screen for the lighting apparatus, based on a user's response to the message that pops up.

On the other hand, when a predetermined time elapses without any input, or an input for terminating the activation of an application is applied to the control screen, the control screen for the lighting apparatus that is output to the region B 603" in FIGS. 6B(a) to 6B(d) disappears from the display unit 170. In such a case, the conjunctional operating of the image display apparatus 100 and the lighting apparatus 300 is maintained for a predetermined time or continuously, and accordingly, as illustrated in FIG. 6B(d), the icon 604 alerting the user to the conjunctional operation is continuously displayed on the display unit 170.

As illustrated above, according to the present invention, the operation of apparatuses in the neighborhood, for example, the lighting apparatuses, which operate in conjunction with the image display apparatus, can be controlled in a convenient, intuitive manner while viewing the image, using the spatial remote controller. In addition, the control screen through which to control the conjunctionally-operating lighting apparatuses is displayed on a larger-scale screen, and this makes it convenient for the user to operate the lighting apparatuses.

On the other hand, when the activation of the lighting apparatus control function application causes the image display apparatus 100 and the lighting apparatus 300 to operate in conjunction with one another, information relating to the current operating state of the lighting apparatuses is received and the content screen that is output to the image display apparatus is analyzed. Thus, a comparison is made to determine whether or not the content screen is suitable for the viewing environment.

Figure 7A:
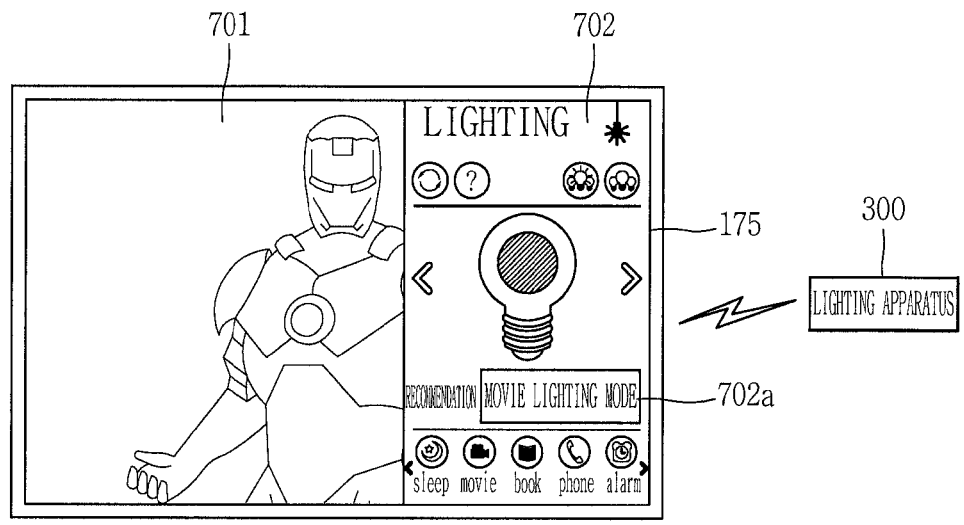
FIGS. 7(a), 7(b) and (7c) are diagrams for describing a method of recommending a lighting mode associated with the content screen in the image display apparatus according to the embodiment of the present invention.
Figure 7B:
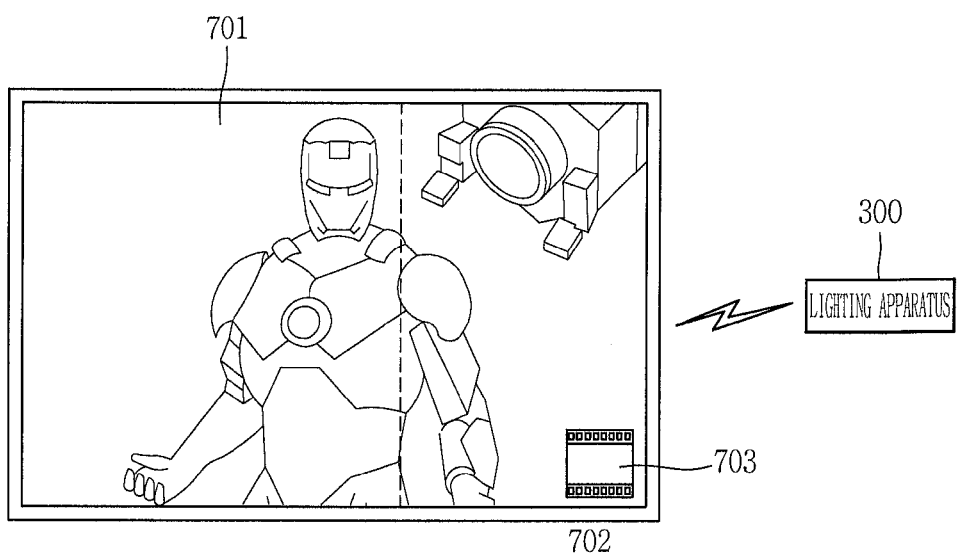
Figure 7C:
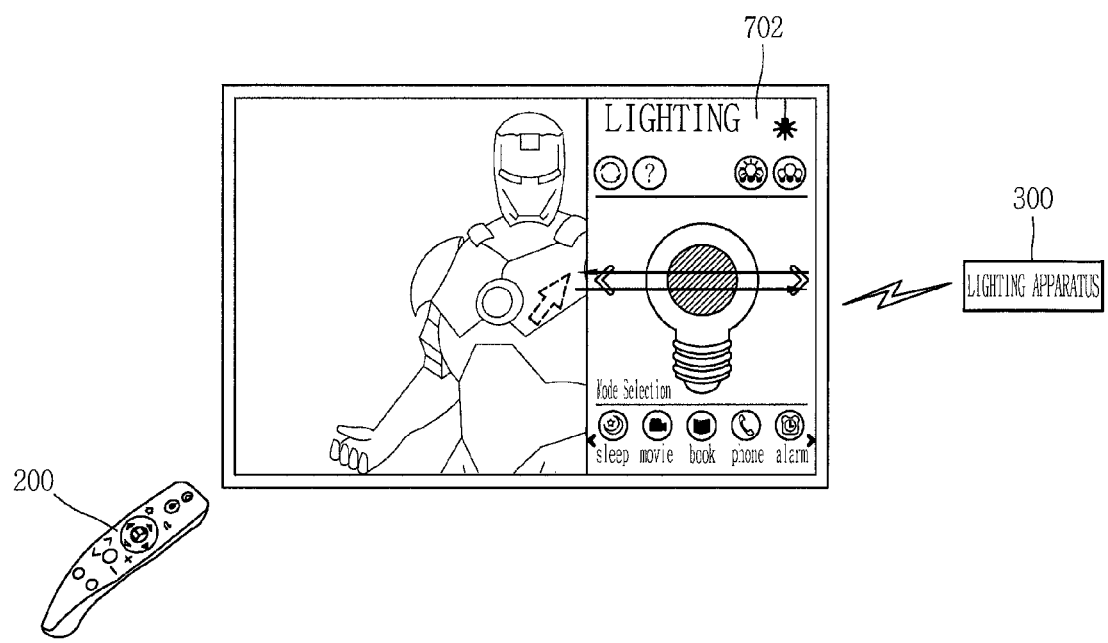

With relation to this, FIGS. 7A to 7C illustrate that a suitable lighting mode associated with the content screen that is output to the display unit 170 is recommended in the image display apparatus 100 according to the embodiment of the present invention.

When the pointing signal is received from the spatial remote controller 200, and thus the pointer displayed on the display unit 170 of the image display apparatus 100 moves in a predetermined pattern, the lighting apparatus control function application corresponding to a stored pattern is activated. Then, the control screen is displayed on one region of the display unit 170.

When the lighting apparatus control function application is activated in this manner, the image display apparatus 100 and the lighting apparatus operate in conjunction with one another. Then, the controller 150 understand the current operating state of the lighting apparatus, and determines whether or not the content screen that is output to the display unit 170 is suitable for the viewing environment.

To do this, the controller 150 collects the context information corresponding to the content screen that is output to the display unit 170 and Meta data, as basic materials. The pieces of context information here include not only a genre, reproduction time, and a program information that are associated with the content screen, but also user context, such as gender information, age information, height information, weight information, background information, and the like that relate to the registered user.

In addition, the Meta data includes both time information and reference data, which relate to a specific turning point, such as a storage position, contents, creator information, a usage condition, reproduction start, a specific scene, reproduction end, and the like that are associated with the content screen that is output to the display unit 170.

Based on the collected context information and Meta data, the controller 150 generates recommendation information for recommending the suitable lighting mode corresponding to the content screen that is output to the display unit 170 and outputs the generated recommendation information to the control screen. Here, the recommendation for the suitable lighting mode is output along with a message guiding the user through the selection of the recommendation.

Next, based on the user's input as a response to the recommendation information displayed on the control screen, the controller 150 controls the conjunctionally-operating lighting apparatuses using the recommended lighting mode.

For example, as illustrated in FIG. 7A, if movie content 701 is output to one region of the display unit 170, and a control screen 702 is output on a different region, an icon 702a for recommending the lighting mode suitable for the movie content 701 is output to one region of the control screen 702. When the user applies an input to the icon 702a on which "movie lighting mode" is displayed, using the spatial remote controller 200, the conjunctionally-operating lighting apparatus 300 automatically adjusts brightness or color in such a manner as to produce the view environment suitable the movie content 701.

As a result, as illustrated in FIG. 7B, the control screen 702 disappears from the display unit 170, an alerting icon 703 alerting the user that a movie lighting mode is activated is displayed on one region, for example, an upper portion of the display unit 170 for a predetermined time. At this time, the image display apparatus 100 and the lighting apparatus 300 continues to operate in conjunction with one another. On the other hand, if the user wants to directly control the lighting apparatus 300, when he/she moves the pointer rightward and leftward using the spatial remote controller 200, the control screen 702 is output back to the display unit 170.

On the other hand, even while operating the recommended lighting apparatus in the recommended lighting mode, the controller 150 performs control in such a manner that at least one lighting apparatus operates at a different lighting mode from the recommended lighting mode, based on the Meta data extracted from a specific scene of the content that is output to the display unit 170.

For example, if while controlling the lighting apparatuses to create an environment suitable for viewing movie content that is being reproduced, a "earthquake scene" appears in the movie content, the lighting apparatus arranged adjacent to the image display apparatus 100 is controlled based on the Meta data extracted at such a turning point, in such a manner that an different operation is temporarily performed.

The suitable lighting mode corresponding to the content screen that is output to the display unit 170, according to the embodiment, is described in detail below.

As one example, if horror movie content is output to the display unit 170, when the user selected recommended information that is displayed on the control screen, the lighting apparatus adjacent to the center of the image display apparatus 100 is adjusted in such a manner that the sounds take on a low-key tone. On the other hand, if in some cases, the user does not want to create such a horror environment, in such a case, he/she makes a selection from detailed items of the recommended information in order for the lighting apparatus not to operate, based on the Meta data corresponding to a "specific scent."

As another example, if content associated with sports is output to the display unit 170, when the user selects the recommended information displayed on the control screen, a color temperature is adjusted to, for example, approximately 6,000K, and a dimming level value is adjusted to, for example, approximately 255 in order to create an environment of which lighting intensity is similar to that of a real-world sports stadium. At this time, information on the real-world sports stadium is extracted from the Meta data or from web information.

On the other hand, even though the user does not select the recommended information that is displayed on the control screen, when an change to the screen does not occur for a predetermined time (for example, 3 minutes or more), the operation of the lighting apparatus is controlled based on the recommended information.

Figure 8A:
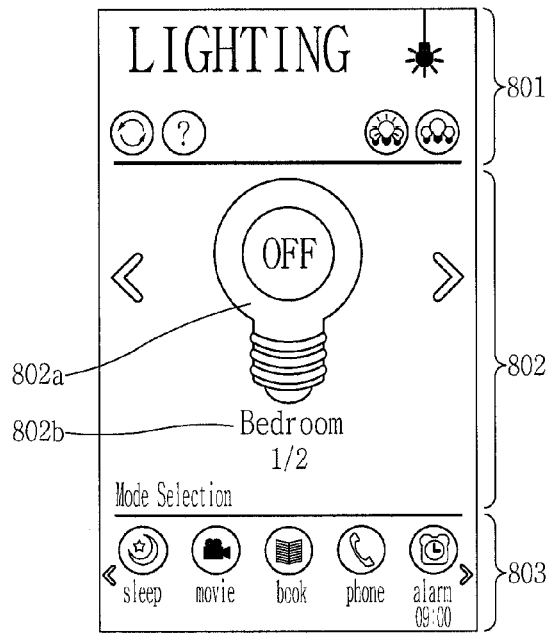
FIGS. 8A(a), 8A(b), 8A(c), 8B(a), 8B(b), 8C(a), 8C(b), 9A(a), 9A(b), 9B(a), 9B(b), 9B(c), 9C(a), 9C(b), 9D(a), 9D(b), 10A(a), 10A(b), 10B(a), 10B(b) and 10B(c) are diagrams for describing various examples in which lighting apparatuses are controlled using the control screen for the external apparatus according to the embodiment of the present invention.
Figure 8A:
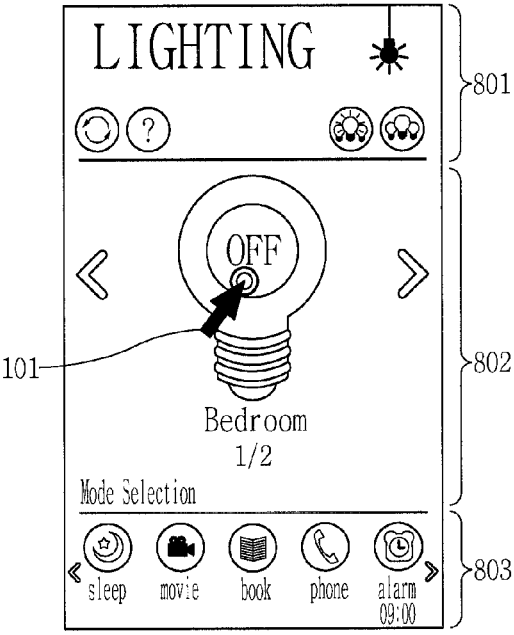
Figure 8A:
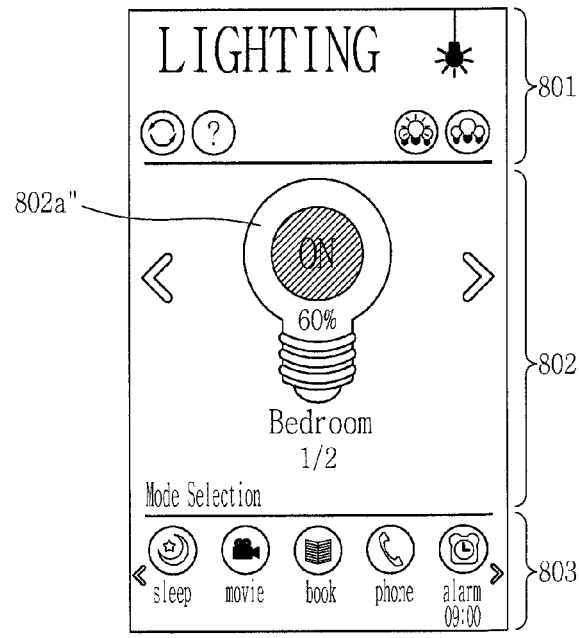

FIGS. 8A(a) to 8C(b), 9A(a) to 9D(b), and 10A(a) to 10B(c) are diagrams for describing various examples in which the lighting apparatuses are controlled using the control screen for the external apparatus according to the embodiment of the present invention.

The user can control the operation of the conjunctionally-operating lighting apparatus in a convenient, intuitive manner by applying predetermined pressure to the control screen that is displayed on the image display apparatus 100 using the spatial remote controller 200.

Specifically, based on the pressure applied to the control screen using the spatial remote controller 200, the controller 150 controls at least one lighting apparatus that operates in conjunction with the image display apparatus 100 through the application. At this time, an image alerting the user to the operating state of at least one lighting apparatus, which corresponds to the performing of the control, is displayed on the control screen.

To do this, the control screen includes a first control region that includes icons corresponding to the selectable lighting mode, and a second control region that includes an image indicating a change in the operating state of the lighting apparatus. In addition, the control screen further includes a third control region that includes icons corresponding to the common control of all the lighting apparatuses.

A function and an operation of the control screen with respect to the control regions are described in more detail below referring to FIGS. 8A(a) to 8C(b), 9A(a) to 9D(b), and 10A(a) to 10B(c).

First, FIGS. 8A(a) to 8C(b) illustrate examples of the function and the operation of the control screen with respect to the second region including the image that indicates the change in the operating state of the lighting apparatus.

First, as illustrated in FIG. 8A(a), the second control region 802 is arranged in the center of the control screen, and a bulb image 802a indicating the operating state of the corresponding lighting apparatus is displayed on the center of the second control region 802. Here, the bulb image 802a includes at least one piece of information, among color, a positional information, and a dimming level value of at least one lighting apparatus.

Specifically, the bulb image 802a corresponds to the multiple lighting apparatuses that are positioned in a "bedroom" 802b, and the operating states of the multiple lighting apparatuses are "OFF."

The inside of the bulb image 802a is displayed in black or colorlessly in order to alert the user to the "OFF" state of the lighting apparatus.

When as illustrated in FIG. 8A(b), in such a state, the user applies an input signal to the spatial remote controller 200 in a state where the pointer 101 points to the bulb image 802a, the operating states of the lighting apparatus that are positioned in the "bedroom" 802b is changed to an "ON" state. Accordingly, the inside color of the bulb image 802a is changed to a corresponding bulb color in order to directly alert the user to the "OFF" state (802a"). At this time, the dimming level value (for example, 60%) of each of the corresponding lighting apparatuses is displayed on the bulb image 802a.

In a state where the image object is fixed to the second control region, when a scroll signal is received, among color, a positional information, and a dimming level value of at least one lighting apparatus that corresponds to the image, at least one is changed according to a scroll direction of the scroll signal.

Specifically, in a state where the pointer 101 points to the bulb image 802a in FIG. 8A(c), when a scroll input is applied in one direction to the wheel provided in the spatial remote controller 200, the controller 150 increases or decreases at least one, among the color, the positional information, and the dimming level value of each of the corresponding lighting apparatuses, which are displayed on the bulb image 802a.

For example, in a state where the pointer 101 points to the bulb image 802a, when the user scrolls downward the wheel provided in the spatial remote controller 200 as illustrated in FIG. 8B(a), the dimming level values of the multiple lighting apparatuses that are positioned in the "bedroom" 802b gradually decrease (for example, by 5%). In contrast, when the user scrolls upward the wheel provided in the spatial remote controller 200 as illustrated in FIG. 8B(b), the dimming level values of the multiple lighting apparatuses that are positioned in the "bedroom" 802b gradually increases (for example, by 100%). At this time, the color and the like of the bulb image 802a change according to the adjusted dimming level value.

To do this, the scroll signal is received from the spatial remote controller 200 through an interface unit 140 of the image display apparatus 100, and the controller 150 increase the dimming level value of each of the multiple lighting apparatuses in proportion to a direction and a speed of the received scroll signal.

Figure 8C:
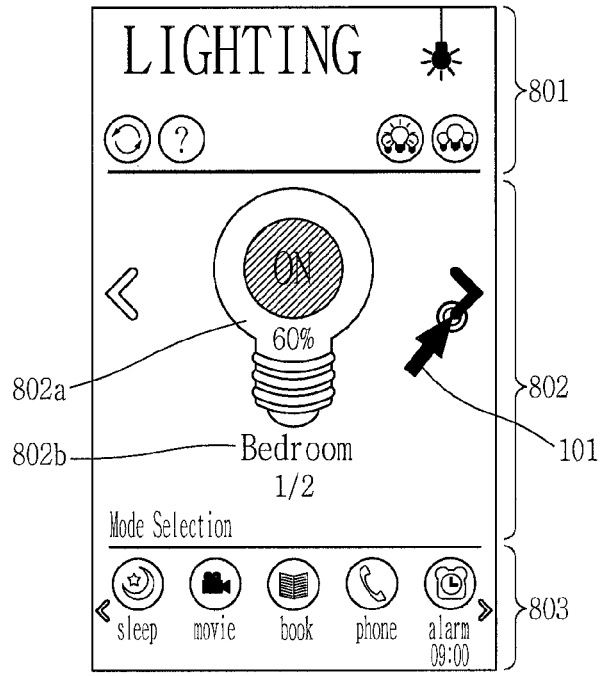
Figure 8C:
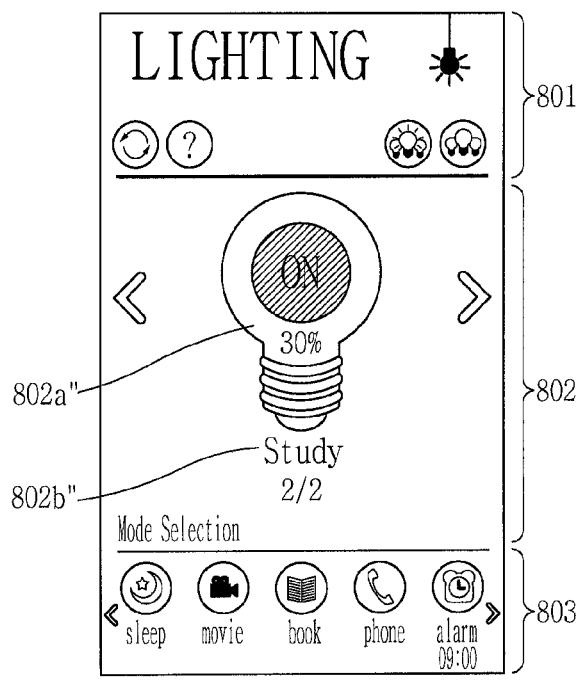

In addition, as illustrated in FIGS. 8C(a) and 8C(b), in a state where a pointer 100 is positioned in an image corresponding to page-turning that is displayed to the left and the right of the bulb image 802a, when an input is applied to the spatial remote controller 200, the operating states of the multiple lighting apparatuses that are positioned in a different place, for example, a "study" are displayed. The user can perform group control on the multiple lighting apparatuses that are positioned in a specific place, by selecting the image corresponding to the forward or backward page-turning.

Figure 9A:
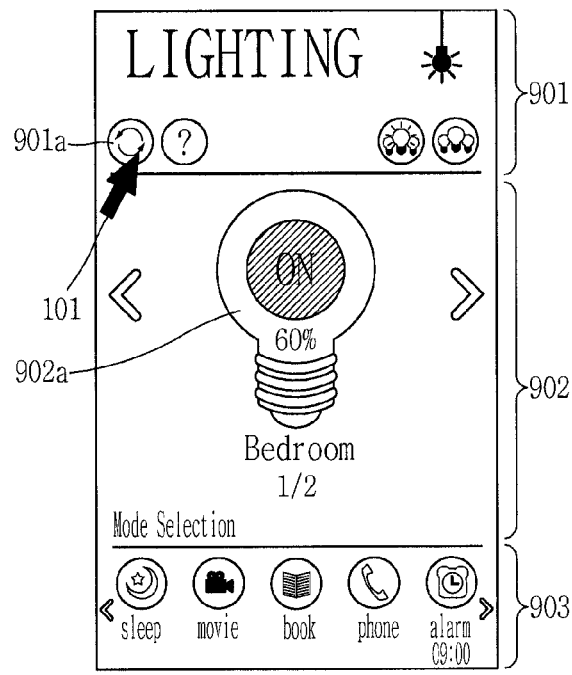
Figure 9A:
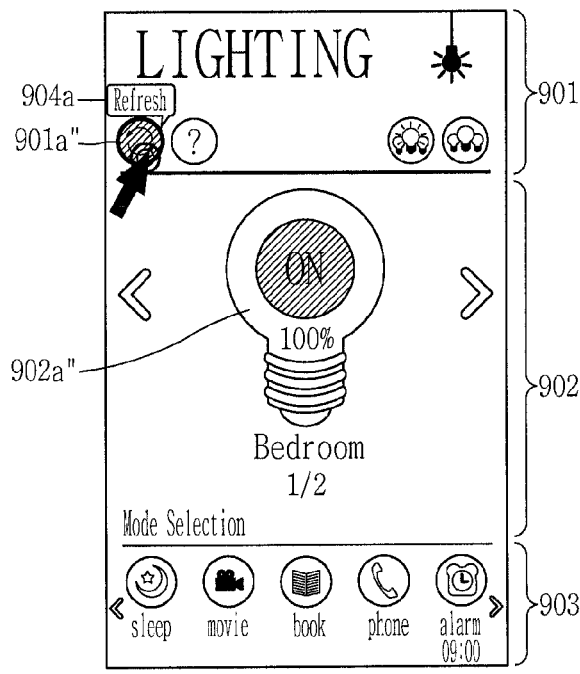

Next, FIGS. 9A(a) to 9D(b) illustrate examples of the function and the operation of the control screen with respect to the third control region including icons corresponding to the common control of all the lighting apparatuses.

As illustrated in FIGS. 9A(a) to 9A(b), the third control region is positioned in an upper portion of the control screen, and through the third control region, all the lighting apparatuses that operate in conjunction with the image display apparatus 100 are controlled in a common manner according to the pointing signal received from the spatial remote controller 200.

For example, in FIGS. 9A(a) and 9A(b), in a state where the pointer 101 is fixed to a first icon 901a, when an input signal is received from the spatial remote controller 200, the control of the lighting apparatus that is performed for a predetermined time is refreshed. Accordingly, as illustrated in FIG. 9A(b), an adjusted dimming level value (for example, 60%) of the lighting apparatus is changed back to the previous value (for example, 100%). At this time, an indicator corresponding to selection of a first icon 901a, for example, an indicator "Refresh" alerting the user to the selected function is displayed to the side of the first icon 901a in the image form of a balloon.

Figure 9B:
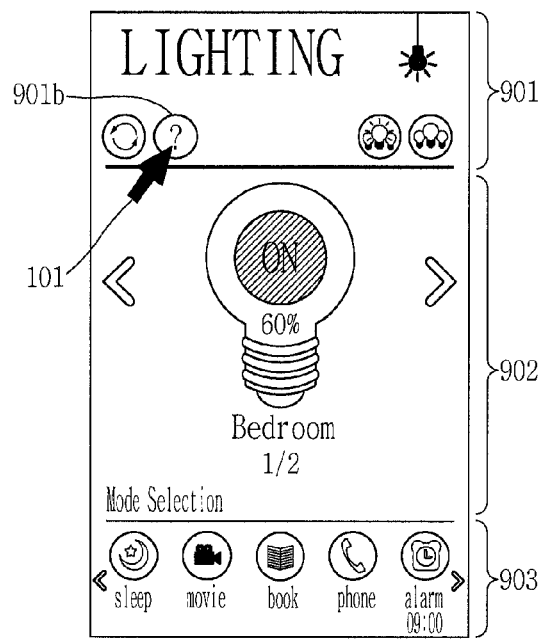
Figure 9B:
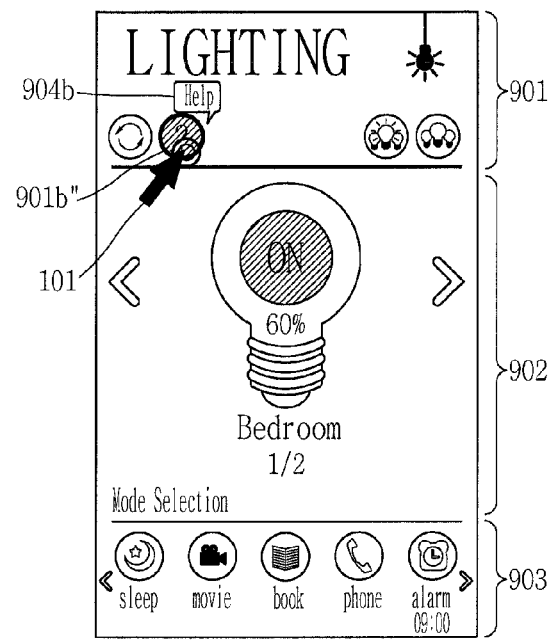
Figure 9B:
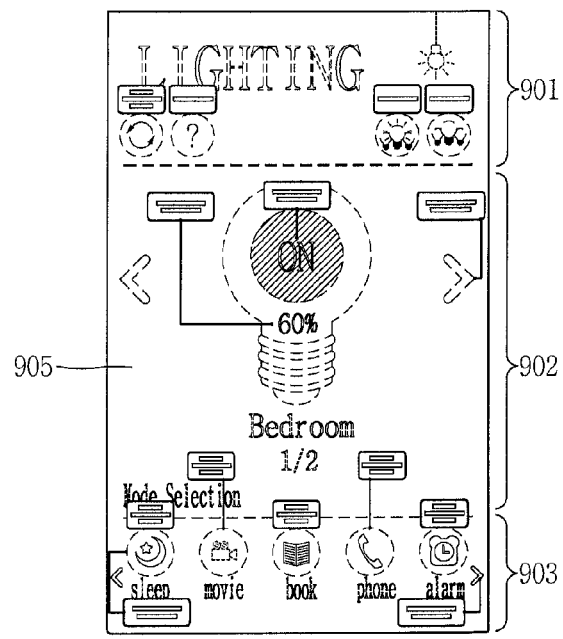

In addition, for example, in FIGS. 9B(a) to 9B(c), when the pointer 101 is fixed to a second icon 901b, when the input signal is received from the spatial remote controller 200, and an indicator "Help" associated with use of the control screen is displayed. Accordingly, as illustrated in FIG. 9B(c), each description of the icons on the controls screen is displayed in the image form of a balloon. When after checking the indicator "Help," the user applies an input to the second icon 901b or clicks on any place on the screen on which the indicator "Help" is displayed, returning to a screen illustrated in FIG. 9B(a) takes place.

Figure 9C:
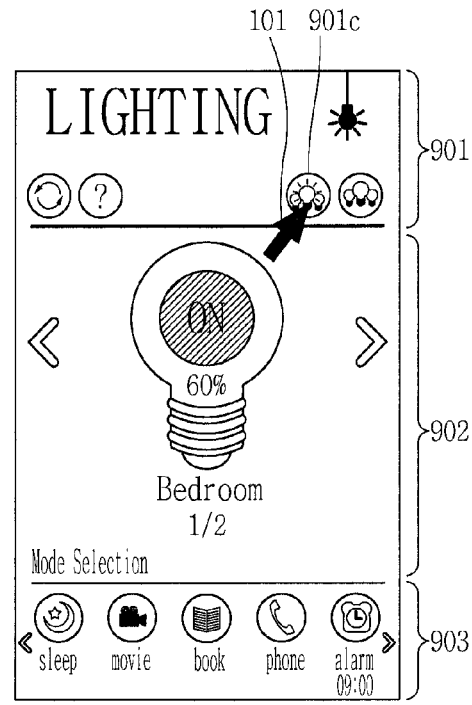
Figure 9C:
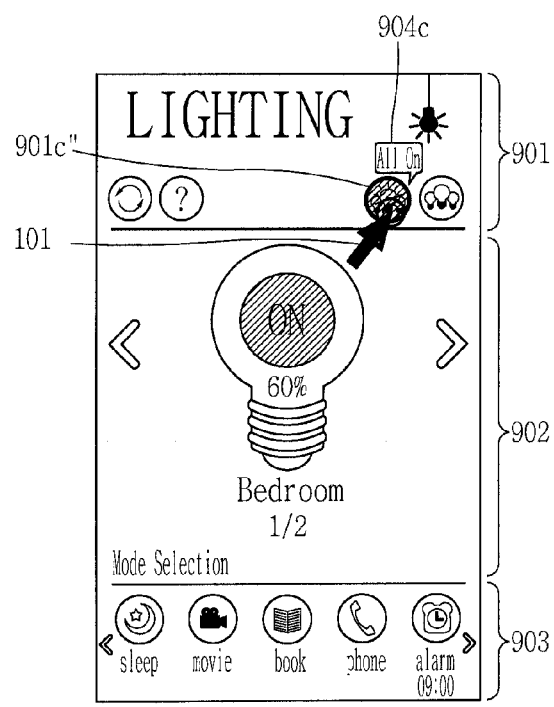
Figure 9D:
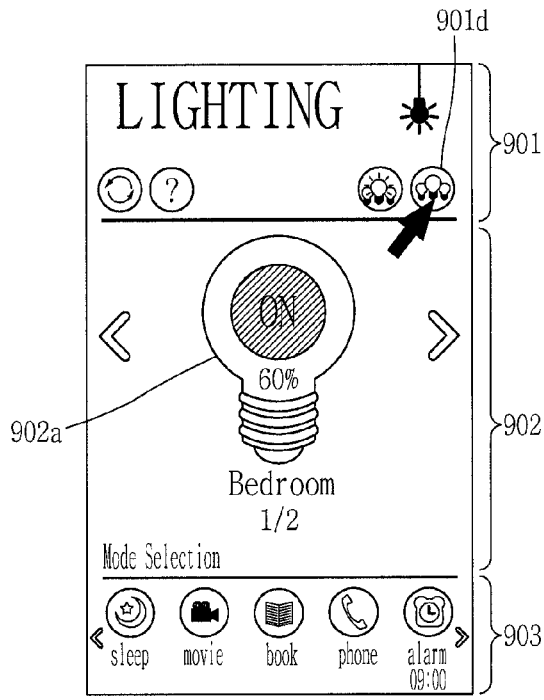
Figure 9D:
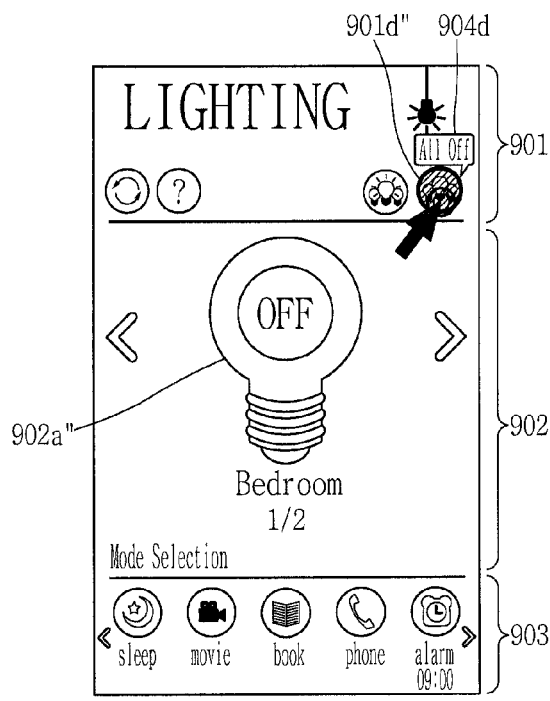

In addition, for example, in FIGS. 9C(a) and 9C(b), in a state where the pointer 101 is fixed to a third icon 901c, when the input signal is received from the spatial remote controller 200, all the lighting apparatuses that operate in conjunction with the image display apparatus 100 are in an ON state regardless of where all the lighting apparatus are positioned. At this time, an indicator 904c "All On" alerting the user to a function of the third icon 901c is displayed to the side of the third icon 901c. In contrast, in FIGS. 9D(a) and 9D(b), in a state where the pointer 101 is fixed to a fourth icon 901d, when the input signal is received from the spatial remote controller 200, all the lighting apparatuses that operate in conjunction with the image display apparatus 100 are in an OFF state regardless of where all the lighting apparatus are positioned. At this time, an indicator 904d "All Off" alerting the user to a function of the fourth icon 904d is displayed to the side of the fourth icon 904d.

Figure 10A:
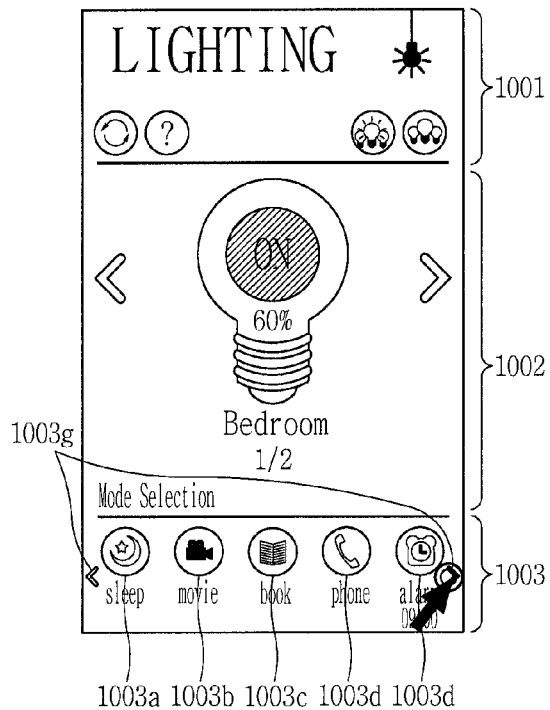
Figure 10A:
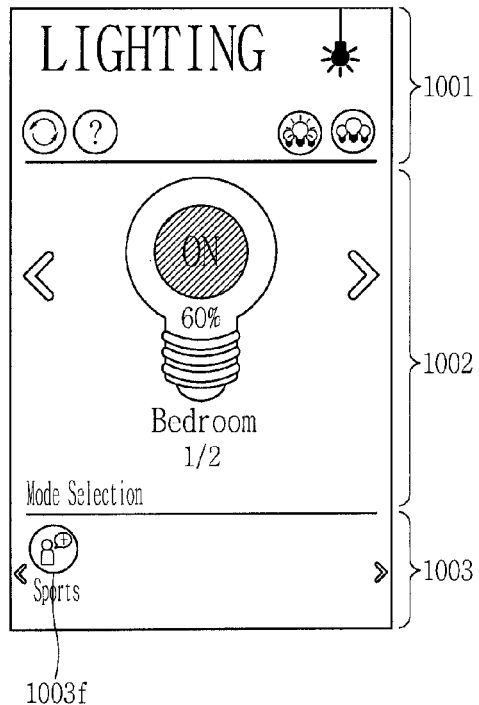

Next, FIGS. 10A(a) and 10A(b) and 10B(a) to 10B(c) illustrate examples of the function and the operation of the control screen with respect to the first control region including icons corresponding to the selectable lighting mode.

As illustrated in FIGS. 10A(a) and 10A(b), a first control region 1003 is arranged in a lower portion of the control screen, and icons corresponding to various operating modes of the lighting apparatuses are displayed. For example, multiple icons corresponding to the multiple operating modes, such as a "sleep mode" icon 1003a, a "movie mode" icon 1003b, a "book mode" icon 1003c, a "call mode" icon 1003d, an "alarm mode" icon 1003e, and a "sports mode" icon 1003f are displayed over multiple pages. The color and the dimming level value of the lighting apparatus are pre-set for every operating mode.

Figure 10B:
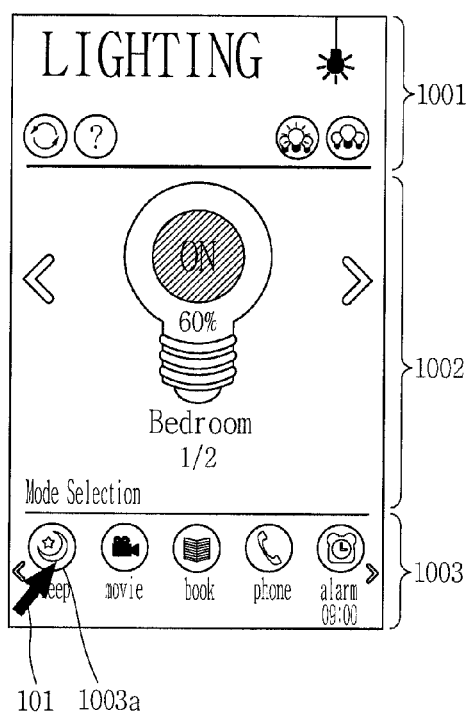
Figure 10B:
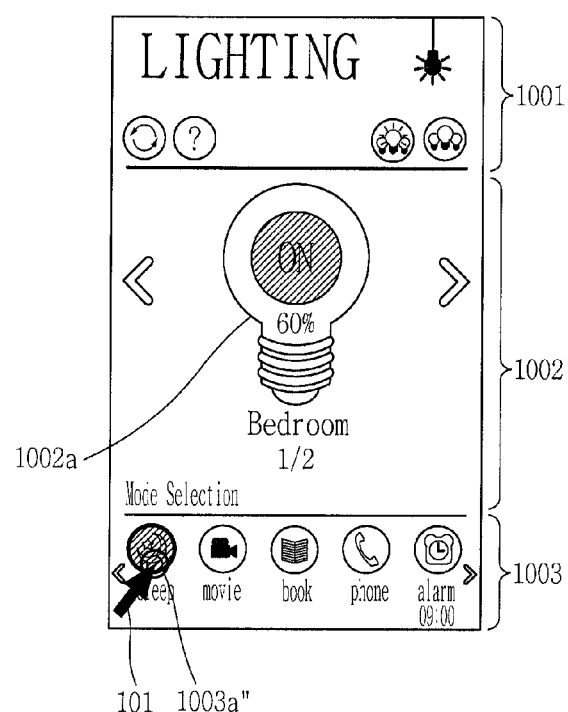
Figure 10B:
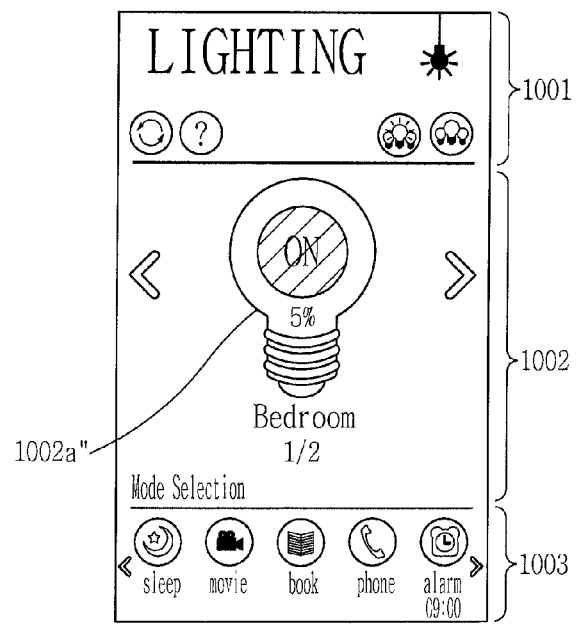

Specifically, referring to FIGS. 10B(a) to 10B(c), when the "sleep mode" icon 1003a is selected using the pointer 101, a shadow effect alerting the user to the selection of the "sleep mode" icon 1003a is provided to the icon 1003a, the color and the dimming level value of the lighting apparatus for the "bedroom" are changed to a predetermined color and a predetermined dimming level value (for example, down to 5% from 60%) that correspond to the sleep mode.

At this time, in a state where the pointer 101 is fixed to any one among icons on the first control 1003, when the scroll signal is received from the spatial remote controller 200, the dimming level value for the lighting mode corresponding to the selected icon is again adjusted according to the scroll direction of the scroll signal. For example, in a state where the dimming level value is adjusted to the dimming level value (for example, down to 5% from 60%) corresponding to the sleep mode, when the wheel of the spatial remote controller 200 is scrolled upward, the dimming level value of 5% increases as much as the wheel is scrolled.

On the other hand, when the pointer is fixed, for a predetermined time, to a specific icon or image object that is displayed on the control screen, the controller 150 changes at least one, among a size and a shape of the specific icon or image object, to which the pointer is fixed. Along with this, the controller 150 further displays guide information relating to a function that is performed by selecting the specific icon or image object.

Figure 11A:
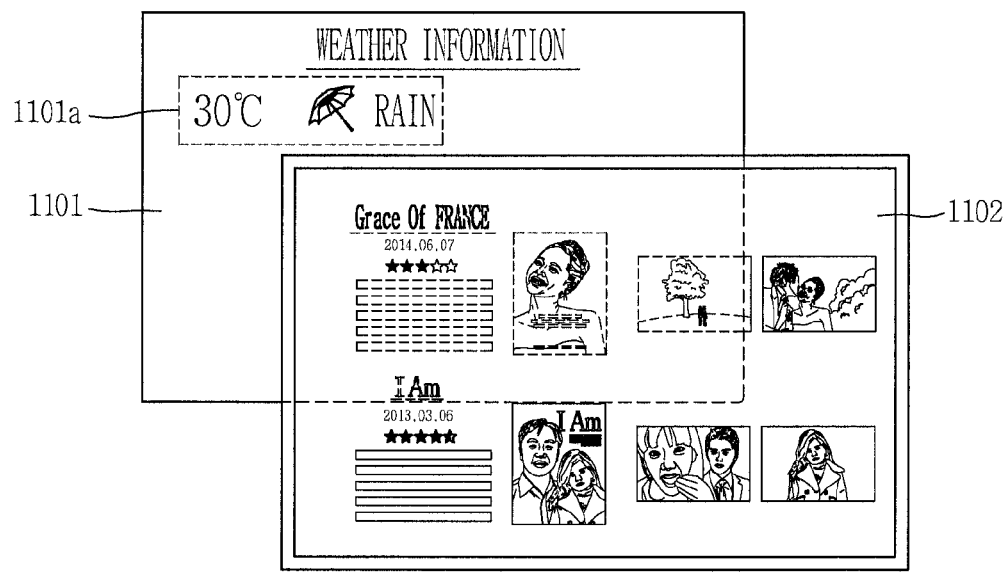
FIGS. 11A(a), 11A(b) and 11A(c) are diagrams for describing a method of recommending the lighting mode suitable for a viewing environment using information provided by a different application in the image display apparatus according to the embodiment of the present invention.
Figure 11A:
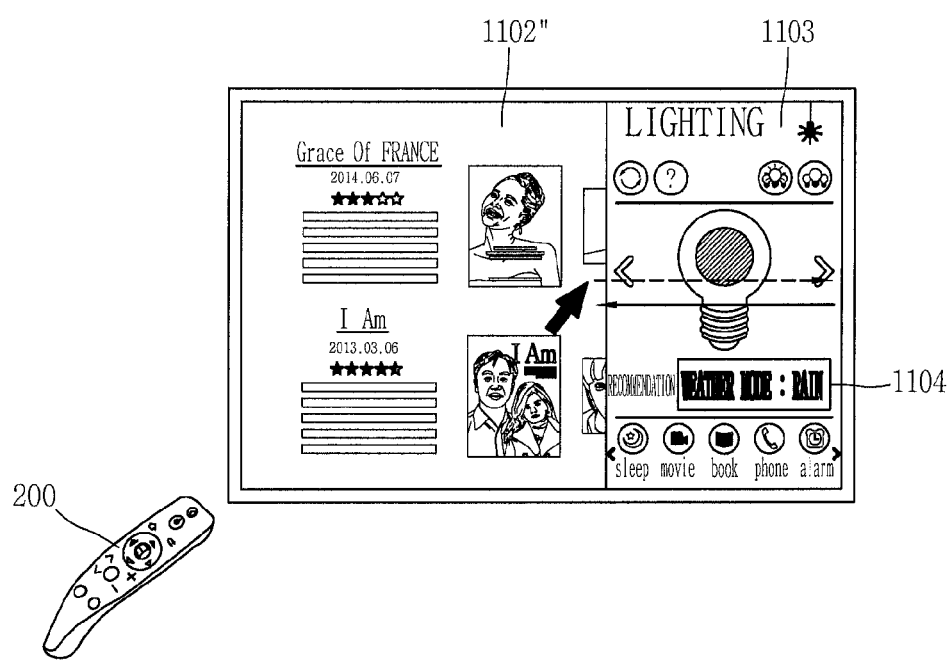
Figure 11A:

FIGS. 11A(a) to 11A(c) are diagrams for describing a method of recommending the lighting mode suitable for the viewing environment using information provided by a different application that is executed on the image display apparatus according to the embodiment of the present invention.

As illustrated in FIGS. 11A(a) to 11A(c), a specific content screen, for example, stored photographs are displayed in the foreground on the display unit 170 of the image display apparatus 100, and a weather application is executed in the background on the display unit 170. In this case, the user can view only a specific content screen through the display unit 170, and the image display apparatus 100 collects pieces of information that can be obtained through the execution of the weather application, such as district information, current temperature, humidity, chance of rain, and the like.

For example, as illustrated in FIG. 11A(a), weather information 1101a indicating that a current temperature is 30° C. and that it rains is obtained through the application that is executed in the background.

In this manner, if a different application is executed in the background on the content screen that is output to the display unit 170, the controller 150 recommends the lighting mode for the lighting apparatus, based on the information that is provided through the different application. Then, the controller 150 displays an icon through which the user selects the recommended information, on the control screen or one region of the content screen.

For example, as illustrated in FIG. 11A(b), when, using the spatial remote controller 200, the user moves the pointer 101 farthest to the right and then moves the pointer 101 back to the left, a control screen 1103 is displayed on one portion of the content screen, in a superimposed manner along the moving path of the pointer 101. Then, an icon 1104 for recommending "weather mode—rain" is displayed on one region of the controls screen 1103, for example, a control region including an image alerting the user to the operating state of the lighting apparatus.

When, using the spatial remote controller 200, the user selects the icon 1104, brightness of each of the lighting apparatuses positioned in the neighborhood of the image display apparatus 100 is adjusted. For example, considering that when it rains, usually, it is dark indoors, the controller 150 increases a little more the dimming level values of the lighting apparatuses positioned in the neighborhood of the image display apparatus 100. At this time, an image (for example, an umbrella image) 1105 alerting the user to the selected operating mode, that is, "weather mode—rain" is displayed on one region, for example, a lower portion of the display unit 170.

On the other hand, although not illustrated, if a game application is executed on the display unit 170, when the user accomplishes a specific mission or improves his/her performance one level while playing a game, or when the user runs out of game playing time, RGB values of the lighting apparatuses in the neighborhood of the image display apparatus 100 are adjusted or the adjacent lighting apparatuses are adjusted to flicker in order to reproduce reality. In addition, if the game application is executed in the display unit 170 and the user plays a game with the other party, the brightness of the lighting apparatuses in the neighborhood of the user is adjusted differently than the brightness of the lighting apparatuses in the neighborhood of the other party, in such a manner that the brightness corresponds to current scores of the game player.

In addition, as another example, if an e-book application is executed, a color temperature (for example, approximately 7,000K) and the dimming level value (for example, approximately 255) are adjusted to be suitable for a reading environment. In addition, although detailed descriptions are omitted, the lighting apparatus is controlled based on pieces of information (for example, an amount of calorie expenditure, a target amount of physical exercise, a frequency change value of a sound value, and the like) that are collected through the execution of a physical exercise application, a sound source application, or the like in order to create a suitable, realistic environment.

In addition, if the lighting mode is different from the lighting mode suitable for the content screen that is currently output to the display unit 170, the image display apparatus 100 first recommends or automatically activates the lighting mode corresponding to predetermined priority, based on the pieces of information that are collected through the different application described above.

In addition, although not illustrated, the controller 150 of the image display apparatus 100 stores control patterns for the lighting apparatuses, which are created based on the input applied to the control screen that is displayed on the display unit 170.

For example, if, while the user views the movie content, the brightness of the lighting apparatus is set to range from 800K to 1,000K, and the dimming level value is set to 100 or below, the image display apparatus 100 stores such operating values of the lighting apparatus. In this case, based on the stored patterns, the controller 150 automatically controls the lighting apparatus, or preferentially recommends the patterns stored in the control screen. As another example, when the user views the content screen after 11:00 p.m. if most of the lighting apparatuses are kept in the OFF state, the image display apparatus 100 memorizes the operating pattern of the lighting apparatus and automatically turns off the lighting apparatus after 11:00 in a state where the content screen is output to the display unit 170.

In addition, although not illustrated, the controller 150 of the image display apparatus 100 controls the lighting apparatus, based on a setting value of an image that is currently output to the display unit 170 or on reservation information or the like that is set to be in the image display apparatus 100. In this case, a change in the state of the lighting apparatus, which corresponds to such control, is displayed on the controls screen. For example, an "automatic power off function" is set to be in the image display apparatus 100, the brightness of the dimming level value gradually decrease from a predetermined time (for example, 5 minutes) before the reservation time that is set. In addition, a "recording reservation function" is set to be in the image display apparatus 100, the brightness of the dimming level value increase in advance a predetermined time (for example, 5 minutes) before the reservation time that is set.

In addition, although not illustrated, according to the present invention, the input is applied to the control screen using the spatial remote controller 200, and thus the lighting apparatus is intuitively controlled using the function provided to the spatial remote controller 200, without outputting the control screen.

For example, when a specific command (for example, "Turn off light in the living room") is input into a microphone (not illustrated) using a "voice recognition function" provided to the spatial remote controller 200, the lighting apparatus that operates in conjunction with the image display apparatus 100 is controlled (for example, the lighting apparatuses are turned off). In addition, for example, all the lighting apparatuses that operate in conjunction with the image display apparatus 100 are turned off when the user blows his/her breath on the microphone (not illustrated) to such an extent that the force of an air current acting on the microphone exceeds a reference value. In addition, for example, the lighting apparatuses that operates in conjunction with the image display apparatus 100 may be directly controlled by operating a touch pas provided to the spatial remote controller 200 or by shaking the spatial remote controller 200 itself leftward and rightward, and upward and downward.

On the other hand, as described above, a different sensor of the image display is not used in order to control the lighting apparatus that operates in conjunction with the image display apparatus 100. Examples are described below in which the conjunctionally-operating lighting apparatus is controlled using a different sensor of the image display apparatus 100, for example, the camera 122.

To do this, the camera 122 is built into the front side of the display unit 170 or into the upper center of the bezel 175. Alternatively, the camera 122 is prepared in a manner that it is mountable on the front side of the display unit 170 or on the upper center of the bezel 175. The camera 122 detects a surrounding environment that appears in front of the image display apparatus 100. In addition, along with multiple infrared sensors (not illustrated), the camera 122 may track user's gaze. Then, the camera 122 is activated as well at a point in time when the lighting apparatus control function application described above is activated.

Figure 11B:
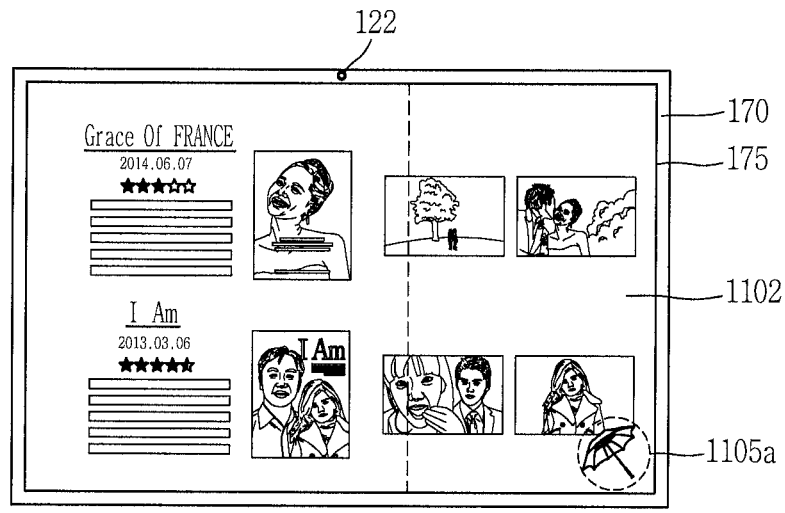
FIGS. 11B(a), 11B(b) and 11B(c) are diagrams for describing a method of activating the suitable lighting mode according to situation information that is obtained using a camera in the image display apparatus according to the embodiment of the present invention.
Figure 11B:
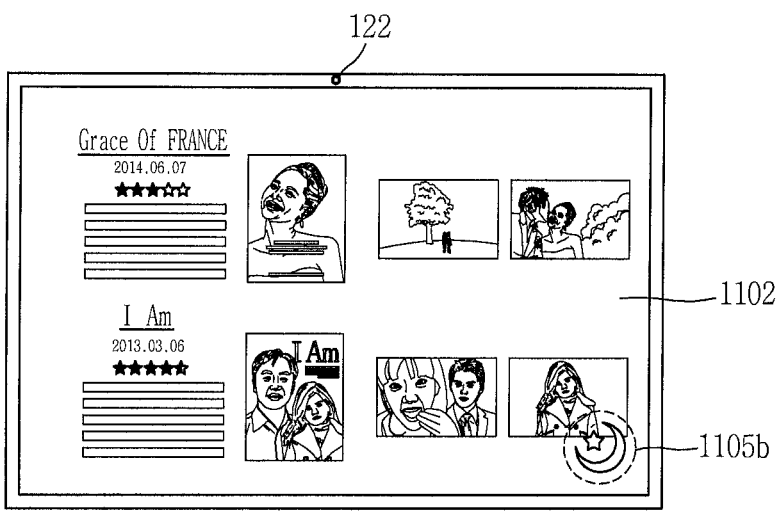
Figure 11B:
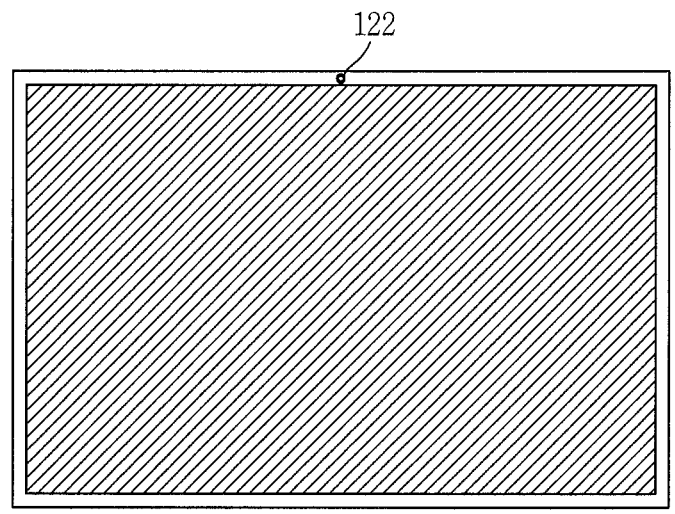

FIGS. 11B(a) to 11B(c) are diagrams for describing a method of activating the suitable lighting mode according to situation information that is obtained using the camera in the image display apparatus according to the embodiment of the present invention.

When the moving path of the pointer displayed on the display unit 170 is matched to a predetermined pattern and thus the control function application described above is activated, the controller 150 controls the lighting apparatus, based on the image that is obtained by the camera 122. Then, an image indicating the change in the state of the lighting apparatus, which corresponds to such control is displayed on the control screen, or on one region of the content screen that is output to the display unit 170.

Specifically, the controller 150 controls the lighting mode associated with the lighting apparatus that operates in conjunction with the image display apparatus 100, in a different manner based on at least one, among the number of the users and state information on the user that are included in the obtained image.

For example, the greater the number of the user included in the obtained image, the more the brightness and the dimming level value of the conjunctionally-operating lighting apparatus are increased. In addition, the darker the color of an object (for example, wallpaper, a sofa, or the like) in the neighborhood that is included in the obtained image, the more the brightness, and the dimming level value of the conjunctionally-operating lighting apparatus, are increased. In addition, for example, if as a result of analyzing the obtained image, it is determined that the user is sleepy, or sleeps, the brightness and the dimming level value of the lighting apparatus that operates in conjunction with the image display apparatus 100 are gradually decreased.

Referring to FIGS. 11B(a) to 11B(c), in a state where a specific content screen 1102 is output to the display unit 170, when while the lighting apparatuses operate in conjunction with the image display apparatus 100 in the operating mode, "weather mode—rain" 1105a, it is determined that the user sleeps, the brightness and the dimming level value of the conjunctionally-operating lighting apparatus are gradually decreased or the conjunctionally-operating lighting apparatus is turned off. Additionally, as illustrated in FIG. 11B(b), an image (for example, a star and moon image) alerting the user that the conjunctionally-operating lighting apparatus operates in the sleep mode is displayed on one region of the display unit 170.

Next, when the user sleeps for a predetermined time (for example, 10 minutes), the display unit 170 of the image display apparatus 100, as illustrated in FIG. 11B(c), switches to an inactivated state. On the other hand, although not illustrated, when it is determined within a predetermined time that the user wakes up, the brightness and the dimming level value of each of the lighting apparatuses that operates in conjunction with the image display apparatus 100 are gradually increased or the turned-off lighting apparatuses switch to the ON-state.

In addition, if there is no need to cause the different application described above, the spatial remote controller 200, and the different sensors provided to the image display apparatus 100 to operate in conjunction with one another, this conjunctional operation may be disabled by applying an input to the control screen that is output to the display unit 170.

As illustrated above, in the image display apparatus and the method of operating the image display apparatus according to the present invention, operations of apparatuses in the neighborhood, for example, lighting apparatuses which operate in conjunction with the image display apparatus, can be controlled in a convenient, intuitive manner while viewing the image, using the spatial remote controller. In addition, a lighting mode suitable for a viewing environment is recommended, considering content that is output to the image display apparatus or primary factors associated with an external environment. Thus, a convenient environment is provided to the user. Furthermore, only if the spatial remote controller moves in a predetermined pattern, an application associated with control of the lighting apparatus is activated. Thus, even though the spatial remote controller is operated unintendedly, an appearance of a control screen does not cause a screen to be covered.

Therefore, an aspect of the detailed description is to provide an image display apparatus that is capable of providing a user interface through which operation of an apparatus in the neighborhood that operates in conjunction with the image display apparatus is conveniently controlled using spatial remote controller while viewing an image in the image display apparatus, and a method of operating the image display apparatus.

Another aspect of the detailed description is to provide an image display apparatus that is capable of recommending an operating mode of an apparatus in the neighborhood, which is suitable for an viewing environment, considering content that is output to an image display apparatus and primary factors associated with an external environment, and a method of operating the image display apparatus.

To achieve these and other advantages and in accordance with the purpose of this specification, as embodied and broadly described herein, there is provided an image display apparatus including: an interface unit through which a pointing signal is received from an external input device; and a display unit that includes a first region and a second region which are distinguishable from each other and on any one of which an image object of which a function is activated by the pointing signal is displayed; and a controller that activates an application corresponding to a predetermined pattern, when in a state where a content screen is output to the first and second regions of the display unit, the image object that is displayed according to the pointing signal moves in the predetermined pattern, in which while maintaining the outputting of the content screen, the controller performs control in such a manner that a control screen for an external apparatus, which corresponds to the activation of the application, is output to the second region.

In the image display apparatus, the controller may control at least one lighting apparatus that connects to the image display apparatus through the application, based on an input that is applied to the control screen, and may perform control in such a manner that an image alerting a user to an operating state of the at least one lighting apparatus, which corresponds to the control, is displayed on the control screen.

The image display apparatus may further include a bezel unit that is formed along a front side edge of the display unit, in which the predetermined pattern may correspond to a moving path in which the image object moving in a straight line direction toward the bezel unit returns to any one of the first and second regions.

In the image display apparatus, the second region may be formed along an edge of the bezel unit, and the controller may perform control in such a manner that the control screen is displayed on one portion of the second region corresponding to the moving path of the image object.

In the image display apparatus, one side of the second region may be made to be in contact with one side of the bezel unit and the first region may be made to be in contact with one side of the second region such that the first region is formed to have a larger size than the second region, and the control screen may be formed to gradually appear from one side of the second region in contact with the bezel unit and to gradually cover one portion of the content screen.

In the image display apparatus, when a predetermined time elapses, the controller may perform control in such a manner that the control screen disappears from the second region and an indicator alerting the user to a change in the operating state of at least one lighting apparatus is displayed on the content screen for a predetermined time.

In the image display apparatus, when the control screen is displayed on the second region, the content screen may be output to a region other than a region on which the control screen is displayed, and when the control screen disappears, the content screen may be output back to the first and second regions.

In the image display apparatus, the controller may generate information for recommending a lighting mode corresponding to the content screen, based on context information and Meta data that correspond to the content screen, and may display the generated the information.

In the image display apparatus, the at least one lighting apparatus that is connected to the image display apparatus in the recommended lighting mode may be controlled based on an input that is applied to the information which is displayed on the control screen.

In the image display apparatus, the controller may control the at least one lighting apparatus in a manner different from the recommended lighting mode, based on the Meta data extracted from a specific scene of the content.

In the image display apparatus, the control screen may include a first control region including icons corresponding to the lighting mode of the at least one lighting apparatus, and a second region that includes an image indicating the change in the operating state of the at least one lighting apparatus.

In the image display apparatus, the interface unit may further include a scroll signal from the external input device, and in a state where the image object is fixed to any one among the icons on the first control region, when the scroll signal is received, the controller may adjust a dimming level value of the lighting mode corresponding to the selected icon according to a scroll direction of the scroll signal.

In the image display apparatus, the image may include at least one piece of information, among a color, a positional information, and a dimming level value of the at least one lighting apparatus, and in a state where the image object is fixed to the second control region, when the scroll signal is received, the controller may change at least one among the color, the positional information and the dimming level value of the at least one lighting apparatus corresponding to the image, according to the scroll direction of the scroll signal.

In the image display apparatus, the control screen may include multiple regions associated with the control of the at least one lighting apparatus, and when the image object is fixed to any one among the multiple regions for a predetermined time, the controller may change at least one among a size and a shape of a corresponding region and may perform control in such a manner as to display guide information relating to control of the corresponding region.

In the image display apparatus, if a different application is executed in the background on the content screen, the controller may recommend the lighting mode associated with the at least one lighting apparatus, based on information provided by the different application, and may display an icon for selecting the recommended lighting mode, on the control screen or the content screen.

In the image display apparatus, the controller may memorize a control pattern of the at least one lighting apparatus, which is configured based on the input applied to the control screen, and may control the at least one lighting apparatus based on the control pattern.

The image display apparatus may further include a camera that is mounted to a front side of the display unit, and through which an image is obtained, in which the controller may control the at least one lighting apparatus based on the obtained image, and may perform control in such a manner that an image alerting the user to a change in a state of the lighting apparatus is displayed on the controls screen or on one region of the content screen.

In the image display apparatus, the controller may control the lighting mode in a different manner, based on at least one piece of information, among the number of the users and state information on the user that are included in the obtained image.

In the image display apparatus, the controller may control the at least one lighting apparatus, based on a setting value of an image that is output to the image display apparatus, and may apply a change in the operating state of the at least one lighting apparatus, which corresponds to the control, to the image.

To achieve these and other advantages and in accordance with the purpose of this specification, as embodied and broadly described herein, there is provided a method of operating an image display apparatus that is connected to an external input device, including: outputting at least one content screen to a display unit of the image display apparatus; receiving a pointing signal from the external input device; and performing control in such a manner that when an image object displayed on the content screen moves in a predetermined pattern according to the pointing signal, an application corresponding to the pattern is activated, and an control screen for an external apparatus corresponding to the activation of the application is displayed on one region of the content screen.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to Affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display apparatus comprising:
a receiver configured to receive a pointing signal from an external input device; and
a display configured to display a content screen and display an image object on the content screen, and the image object is moved according to the received pointing signal; and
a controller is configured to:
detect a moving path of the image object when the pointing signal is received, when the detected moving path of the image object corresponds to a predetermined pattern and a moving speed of the image object is not greater than a reference value:
    activate an application based on the predetermined pattern,
    communicate with at least one external apparatus corresponding to the activated application, and
    display a control screen for controlling the at least one external apparatus on the content screen, and
when the detected moving path of the image object corresponds to the predetermined pattern and the moving speed of the image object is greater than the reference value, output information asking whether or not to output the control screen.

2. The image display apparatus of claim 1,
wherein the display includes a first region and a second region, and the image object is displayed on any one of the first region and the second region,
wherein the controller is further configured to:
    control at least one lighting apparatus that connects to the image display apparatus through the application, based on an input at the control screen, and
    control the display such that a first image is displayed at the control screen of the display, the first image to provide information regarding an operating state of the at least one lighting apparatus.

3. The image display apparatus of claim 2, further comprising:
a bezel at a front side edge of the display,
wherein the predetermined pattern corresponds to a moving path in which the image object is moved toward the bezel and is subsequently returned to one of the first and second regions of the display.

4. The image display apparatus of claim 3, wherein the second region is formed at an edge of the bezel, and
    wherein the controller controls the display such that the control screen is displayed at a portion of the second region corresponding to the moving path of the image object.

5. The image display apparatus of claim 3, wherein the controller controls the display to display one side of the second region contacting one side of the bezel and the first region contacting one side of the second region such that the first region has a larger size than the second region, and
    wherein the controller controls the display to display the control screen to gradually appear from one side of the second region that contacts the bezel unit and to gradually cover a portion of the content screen.

6. The image display apparatus of claim 5, wherein when a first predetermined amount of time elapses, the controller controls the display such that the control screen disappears from the second region and an indicator is displayed at the content screen for a second predetermined amount of time, the indicator to provide information regarding a change in the operating state of the at least one lighting apparatus.

7. The image display apparatus of claim 2, wherein the controller is further configured to:
    provide information for recommending a lighting mode corresponding to the content screen, based on context information and Meta data that corresponds to the content screen, and
    display the information on the control screen.

8. The image display apparatus of claim 7, wherein the at least one lighting apparatus that is connected to the image display apparatus is controlled based on an input at the displayed information.

9. The image display apparatus of claim 8, wherein the controller controls the at least one lighting apparatus in a different manner from the recommended lighting mode, based on the Meta data from a specific scene of the content.

10. The image display apparatus of claim 2, wherein the control screen includes a first control region and a second control region, the first control region including icons corresponding to a lighting mode of the at least one lighting apparatus, and the second region includes an image indicating the change in the operating state of the at least one lighting apparatus.

11. The image display apparatus of claim 10, wherein the receiver receives a scroll signal from the external input device, and
    wherein when the image object is at one of the icons at the first control region while the scroll signal is received at the receiver, the controller adjusts a dimming value of the lighting mode corresponding to the selected icon based on a scroll direction of the scroll signal.

12. The image display apparatus of claim 11, wherein the image includes at least one piece of information, from among a color, a positional information, and a dimming value of the at least one lighting apparatus, and
    wherein when the image object is at the second control region while the scroll signal is received at the receiver, the controller changes at least one of the color, the positional information and the dimming value of the at least one lighting apparatus corresponding to the image, based on the scroll direction of the scroll signal.

13. The image display apparatus of claim 2, wherein the control screen includes multiple regions associated with the at least one lighting apparatus, and
    wherein when the image object is at one of the multiple regions for a predetermined time, the controller changes at least one of a size and a shape of a corresponding region and controls the display to display, on the control screen, guide information relating to control of the corresponding region.

14. The image display apparatus of claim 2, wherein when a different application is executed at a background of the content screen, the controller recommends a lighting mode associated with the at least one lighting apparatus, based on information provided by the different application, and the controller controls the display to display an icon for selecting the recommended lighting mode, on the control screen or the content screen.

15. The image display apparatus of claim 2, wherein the controller stores a control pattern of the at least one lighting apparatus, which is configured based on the input at the control screen, and the controller controls the at least one lighting apparatus based on the control pattern.

16. The image display apparatus of claim 2, further comprising:
    a camera at a front side of the display, and the camera to obtain an image,
    wherein the controller controls the at least one lighting apparatus based on the obtained image, and the controller controls the display such that a second image is displayed at the control screen or at the content screen, the displayed second image to provide information regarding a change in a state of the lighting apparatus.

17. The image display apparatus of claim 16, wherein the controller controls the lighting mode in a different manner, based on at least one piece of information, from among a number of the users and state information on the user included in the obtained image.

18. The image display apparatus of claim 2, wherein the controller controls the at least one lighting apparatus, based on a setting value of a second image displayed at the image display apparatus, and the controller applies, to the image, a change in the operating state of the at least one lighting apparatus.

19. The image display apparatus of claim 1, wherein when the control screen is displayed at the second region, the content screen is displayed at a region other than a region that displays the control screen, and
wherein when the control screen disappears from the display, the content screen is displayed at the first and second regions.

20. A method of operating an image display apparatus to connect to an external input device, comprising:
displaying at least one content screen on a display of the image display apparatus;
receiving a pointing signal from the external input device;
displaying an image object on the content screen, and the image object is moved according to the received pointing signal;
in response to receiving the pointing signal, detecting a moving path of the image object;
when the detected moving path of the image object corresponds to a predetermined pattern and a moving speed of the image object is not greater than a reference value:
activating an application corresponding to the pattern, communicating with at least one external apparatus corresponding to the activated application, and
displaying a control screen for controlling the at least one external apparatus on the content screen, and
when the moving path of the image object corresponds to the predetermined pattern and the moving speed of the image object is greater than the reference value, outputting information asking whether or not to output the control screen.

21. The method of claim 20, further comprising:
displaying an image at the control screen, the image to provide information regarding an operating state of a lighting apparatus.

22. The method of claim 21, further comprising:
displaying an indicator at the content screen for a predetermined amount of time, the indicator to provide information regarding a change in the operating state of the lighting apparatus.

23. The method of claim 21, wherein the control screen includes a first control region and a second control region,
wherein icons are displayed at the first control region, the icons to correspond to a lighting mode of the lighting apparatus, and
wherein an image is displayed at the second region, the image to provide information regarding a change in the operating state of the lighting apparatus.

* * * * *